US012808731B2

(12) United States Patent
Suh et al.

(10) Patent No.: US 12,808,731 B2
(45) Date of Patent: Nov. 24, 2026

(54) EXTENDING FIBER OPTIC SENSING

(71) Applicant: Halliburton Energy Services, Inc., Houston, TX (US)

(72) Inventors: Kwang Il Suh, Houston, TX (US); Mikko K. Jaaskelainen, Houston, TX (US); Andreas Ellmauthaler, Houston, TX (US); Glenn Wilson, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 1066 days.

(21) Appl. No.: 17/972,802

(22) Filed: Oct. 25, 2022

(65) Prior Publication Data

US 2024/0133753 A1 Apr. 25, 2024
US 2024/0230426 A9 Jul. 11, 2024

(51) Int. Cl.

| | |
|---|---|
| ***G01K 11/322*** | (2021.01) |
| ***E21B 47/07*** | (2012.01) |
| ***E21B 47/113*** | (2012.01) |
| ***E21B 47/135*** | (2012.01) |
| ***G01H 9/00*** | (2006.01) |

(Continued)

(52) U.S. Cl.
CPC ............ *G01K 11/322* (2021.01); *E21B 47/07* (2020.05); *E21B 47/114* (2020.05); *E21B 47/135* (2020.05); *G01H 9/004* (2013.01); *G01K 11/324* (2021.01); *H04B 10/07953* (2013.01)

(58) Field of Classification Search
CPC ...... G01H 9/004; G01H 9/006; G01K 11/322; E21B 47/114; E21B 47/135
USPC .................................. 385/12, 13; 340/854.7
See application file for complete search history.

(56) References Cited

U.S. PATENT DOCUMENTS

| | | |
|---|---|---|
| 6,933,491 B2 | 8/2005 | Maida, Jr. |
| 7,165,892 B2 | 1/2007 | Grigsby et al. |
| 7,228,898 B2 | 6/2007 | Grigsby et al. |

(Continued)

FOREIGN PATENT DOCUMENTS

| | | |
|---|---|---|
| EP | 3754868 | 12/2020 |
| WO | 2021165700 | 8/2021 |

OTHER PUBLICATIONS

International Search Report and Written Opinion for International Patent Application No. PT/US2022/048983 dated Jul. 11, 2023.

(Continued)

*Primary Examiner* — Michael Stahl
(74) *Attorney, Agent, or Firm* — Scott Richardson; C. Tumey Law Group PLLC

(57) ABSTRACT

A method for tuning a distributed acoustic sensing (DAS) system. The method may include determining a signal strength from a first Raman Pump in the DAS system, sweeping a laser pulse output from a transmitter; wherein the sweeping is an incremental increase of a power of the laser pulse output from a minimum pulse power to a maximum pulse power, and measuring a first signal-to-noise-ratio (SNR) for each of the incremental increase of the power of the laser pulse output. The method may further comprise selecting a maximum SNR from the first SNR for each of the incremental increase of the power of the laser pulse output and configuring the first Raman Pump and the laser pulse output based at least in part on the maximum SNR.

22 Claims, 25 Drawing Sheets

(51) Int. Cl.
*G01K 11/324* (2021.01)
*H04B 10/079* (2013.01)

(56) References Cited

U.S. PATENT DOCUMENTS

| | | | | |
|---|---|---|---|---|
| 7,254,289 | B2 | 8/2007 | Wait et al. | |
| 8,919,439 | B2 | 12/2014 | Grigsby et al. | |
| 2005/0225843 | A1 | 10/2005 | Sugaya et al. | |
| 2015/0205090 | A1 | 7/2015 | Jalali et al. | |
| 2016/0259083 | A1 * | 9/2016 | Barfoot | E21B 47/07 |
| 2020/0362692 | A1 | 11/2020 | Ellmauthaler et al. | |
| 2022/0236106 | A1 | 7/2022 | Ellmauthaler et al. | |
| 2023/0033128 | A1 * | 2/2023 | Wysocki | G01H 9/004 |

OTHER PUBLICATIONS

Baker Hughes SureVIEW fiber, SureCONNECT completion system, 2019.

* cited by examiner

EXTENDING FIBER OPTIC SENSING

BACKGROUND

Boreholes drilled into subterranean formations may enable recovery of desirable fluids (e.g., hydrocarbons) using a number of different techniques. A number of systems and techniques may be employed in subterranean operations to determine borehole and/or formation properties. For example, Distributed Acoustic Sensing (DAS) along with a fiber optic system may be utilized together to determine borehole and/or formation properties. Distributed fiber optic sensing is a cost-effective method of obtaining real-time, high-resolution, highly accurate temperature and strain (acoustic) data along the entire wellbore. In examples, discrete sensors, e.g., for sensing pressure and temperature, may be deployed in conjunction with the fiber optic cable. Additionally, distributed fiber optic sensing may eliminate downhole electronic complexity by shifting all electro-optical complexity to the surface within the interrogator unit. Fiber optic cables may be permanently deployed in a wellbore via single- or dual-trip completion strings, behind casing, on tubing, or in pumped down installations; or temporally via coiled tubing slickline, or disposable cables.

Fiber optic cables are typically characterized by a constant gain/loss profile across the sensing fiber span. This implies that backscatter signals are similarly attenuated as a function of distance along the sensing fiber. Additionally, in dual trip and/or multi-zone completions, additional mechanisms utilized to attach the fiber optic cables to other devices or other fiber optic cables are required. For example, there may be optical wet-mate, dry-mate, and/or splice connections to provide optical continuity through otherwise piecewise continuous sensing fiber segments. These mechanisms introduce insertion loss to the fiber optic cables. Distributed acoustic sensing (DAS) preferentially operates by having a continuous fiber. Points of insertion loss degrade the signal-to-noise from the point of insertion loss and below. This is a significant degradation in signal quality.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates generally to a system and method for using fiber optics in a DAS system in a subsea operation. Subsea operations may present optical challenges which may relate to the quality of the overall signal in the DAS system with a longer fiber optical cable. To improve signal-to-noise-ratio (SNR), a configuration of enhanced backscatter fibers may be supplemented with gradient or step response in backscatter, such that the receiver backscatter signals are consistent across the sensing fiber span (with or without optical connectors).

Enhanced backscatter fibers are used to improve Distributed Acoustic Sensing (DAS) signal-to-noise-ratio (SNR). However, they are able to degrade SNR if not managed appropriately. For example, signal fidelity loss via cross-talk increases may degrade sensing performance. In examples, the fiber optic cables may have a consistence backscatter response, so the signal levels from the start of fiber are similar to the signal levels at the end of fiber (or in other words, the received signal levels from the end of fiber are not sufficiently smaller—due to attenuation—than those at the start of fiber).

Additionally, dual trip and/or multi-zone completions may utilize optical wet-mate, dry-mate, and/or splice connections to provide optical continuity through otherwise piecewise continuous sensing fiber segments. These connectors all introduce insertion loss. DAS systems operate with a single set of controls (e.g., controlling the launch signal strength, receive EDA gains, etc.). Having loss profiles along a completion implies DAS data quality is degraded. Enhanced backscatter fibers (EBFs) have been introduced for DAS. The EBFs are processed to have a gain (i.e., backscatter coefficient higher than native Rayleigh backscatter coefficient for a normal fiber) that improves DAS SNR. The gain can be specified during fiber manufacturing.

The EBF elements of each zone may be specified so as to compensate for the insertion losses of any connector prior to the EBF element. For example, the first EBF element has a gain of 10 dB, and is optically coupled via a 1 dB (two-way loss) wet-mate connector to a second EBF element with a gain of 11 dB, which is optically coupled to a 1 dB (two-way) wet-mate connector to a third EBF element with a gain of 13 dB. This way, the gain profile of the EBF offsets insertion losses of the connectors. Moreover, the gain profile of the EBF segments need not be linear, but may (linearly or exponentially) increase with distance to offset attenuation along the EBF segment, thus providing uniform measurement sensitivity along the fiber optic cable.

Figure 1:
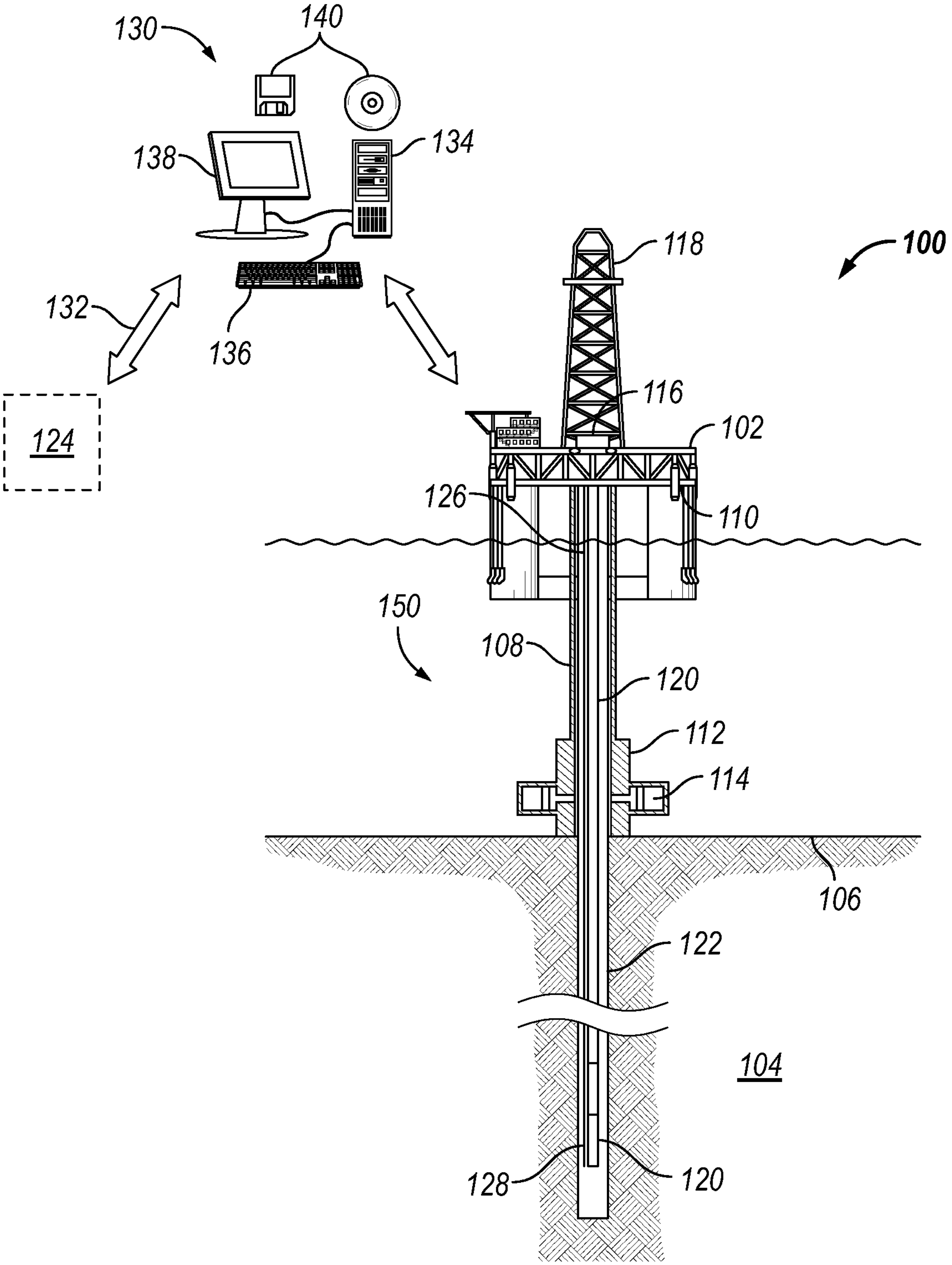
FIG. 1 illustrate an example of a well measurement system in a subsea environment.

FIG. 1 illustrates a well system 100 that may employ the principles of the present disclosure. More particularly, well system 100 may comprise a floating vessel 102 centered over a subterranean hydrocarbon bearing formation 104 located below a sea floor 106. As illustrated, floating vessel 102 is depicted as an offshore, semi-submersible oil and gas drilling platform, but could alternatively comprise any other type of floating vessel such as, but not limited to, a drill ship, a pipe-laying ship, a tension-leg platforms (TLPs), a "spar" platform, a production platform, a floating production, storage, and offloading (FPSO) vessel, and/or the like. Additionally, the methods and systems described below may also be utilized on land-based drilling operations. A subsea conduit or riser 108 extends from a deck 110 of floating vessel 102 to a wellhead installation 112 that may comprise one or more blowout preventers 114. A person skilled in the art recognizes that a floating vessel 102 may be connected to multiple wellhead installations 112 where the multiple wellhead installations 112 may be located at varying distances from the floating vessel 102 through riser 108. In examples, riser 108 may also be referred to as a flexible riser, flowline, umbilical, and/or the like. Floating vessel 102 has a hoisting apparatus 116 and a derrick 118 for raising and lowering tubular lengths of drill pipe, such as a tubular 120. In examples, tubular 120 may be a drill string, casing, production pipe, and/or the like.

A wellbore 122 extends through the various earth strata toward the subterranean hydrocarbon bearing formation 104 and tubular 120 may be extended within wellbore 122. Even though FIG. 1 depicts a vertical wellbore 122, it should be understood by those skilled in the art that the methods and systems described are equally well suited for use in horizontal or deviated wellbores. During drilling operations, the distal end of tubular 120, for example a drill sting, may comprise a bottom hole assembly (BHA) that comprises a drill bit and a downhole drilling motor, also referred to as a positive displacement motor ("PDM") or "mud motor." During production operations, tubular 120 may comprise a DAS system 150. DAS system 150 may be inclusive of an interrogator 124, umbilical line 126, and fiber optic cable 128.

Figure 3A:
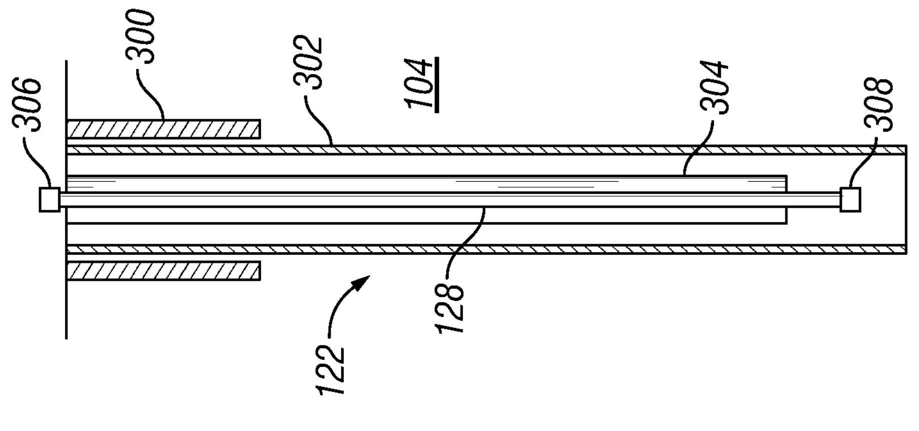
FIGS. 3A-3D illustrates examples of a downhole fiber deployed in a wellbore.

Fiber optic cable 128 may be permanently deployed in a wellbore via single- or dual-trip completion strings, behind casing, on tubing, or in pumped down installations. In examples, fiber optic cable 128 may be temporarily deployed via coiled tubing, wireline, slickline, or disposable cables. FIGS. 3A-3D illustrate different types of deployment of fiber optic cable 128 in wellbore 122 (e.g., referring to FIG. 1). As illustrated in FIG. 3A, wellbore 122 deployed in formation 104 may comprise surface casing 300 in which production casing 302 may be deployed. Additionally, production tubing 304 may be deployed within production casing 302. In this example, fiber optic cable 128 may be temporarily deployed in a wireline system in which a bottom hole gauge 308 is connected to the distal end of fiber optic cable 128. Further illustrated, fiber optic cable 128 may be coupled to a fiber connection 306. Without limitation, fiber connection 306 may attach fiber optic cable 128 to umbilical line 126 (e.g., referring to FIG. 1). Fiber connection 306 may operate with an optical feedthrough system (itself comprising a series of wet- and dry-mate optical connectors) in the wellhead that optically couples fiber optic cable 128 from the tubing hanger to umbilical line 126 on the wellhead instrument panel. Umbilical line 126 may comprise of an optical flying lead, optical distribution system(s), umbilical termination unit(s), and transmission fibers encapsulated in flying leads, flow lines, rigid risers, flexible risers, and/or one or more umbilical lines. This may allow for umbilical line 126 to connect and disconnect from fiber optic cable 128 while preserving optical continuity between the umbilical line 126 and the fiber optic cable 128.

Figure 3B:
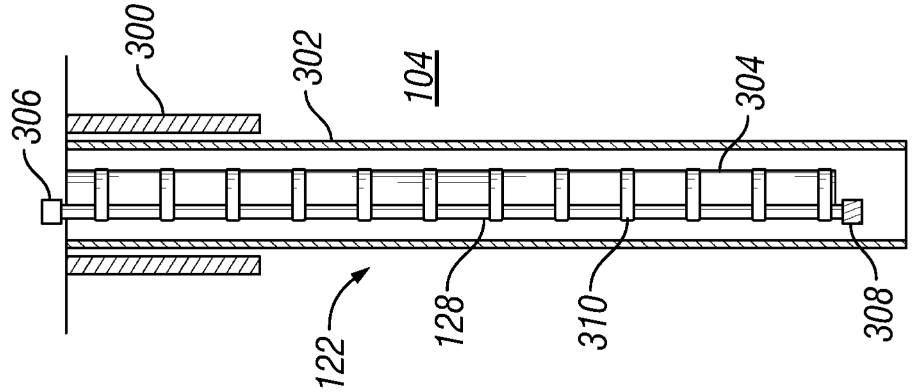

FIG. 3B illustrates a permanent deployment of fiber optic cable 128. As illustrated in wellbore 122 deployed in formation 104 may comprise surface casing 300 in which production casing 302 may be deployed. Additionally, production tubing 304 may be deployed within production casing 302. In examples, fiber optic cable 128 is attached to the outside of production tubing 304 by one or more cross-coupling protectors 310. Without limitation, cross-coupling protectors 310 may be evenly spaced and may be disposed on every other joint of production tubing 304. Further illustrated, fiber optic cable 128 may be coupled to fiber connection 306 at one end and bottom hole gauge 308 at the opposite end.

Figure 3C:
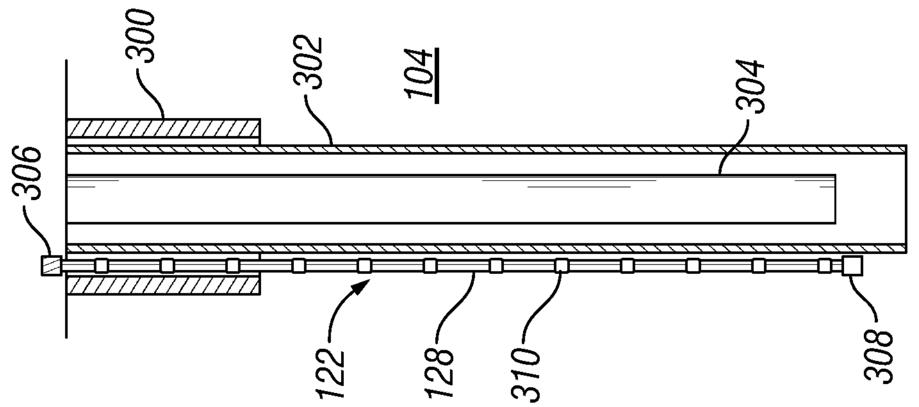

FIG. 3C illustrates a permanent deployment of fiber optic cable 128. As illustrated in wellbore 122 deployed in formation 104 may comprise surface casing 300 in which production casing 302 may be deployed. Additionally, production tubing 304 may be deployed within production casing 302. In examples, fiber optic cable 128 is attached to the outside of production casing 302 by one or more cross-coupling protectors 310. Without limitation, cross-coupling protectors 310 may be evenly spaced and may be disposed on every other joint of production tubing 304.

Further illustrated, fiber optic cable 128 may be coupled to fiber connection 306 at one end and bottom hole gauge 308 at the opposite end.

Figure 3D:
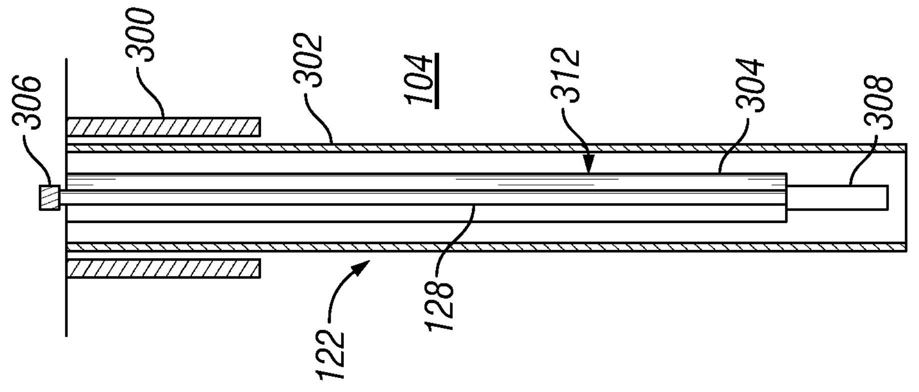

FIG. 3D illustrates a coiled tubing operation in which fiber optic cable 128 may be deployed temporarily. As illustrated in FIG. 3D, wellbore 122 deployed in formation 104 may comprise surface casing 300 in which production casing 302 may be deployed. Additionally, coiled tubing 312 may be deployed within production casing 302. In this example, fiber optic cable 128 may be temporarily deployed in a coiled tubing system in which a bottom hole gauge 308 is connected to the distal end of downhole fiber. Further illustrated, fiber optic cable 128 may be attached to coiled tubing 312, which may move fiber optic cable 128 through production casing 302. Further illustrated, fiber optic cable 128 may be coupled to fiber connection 306 at one end and bottom hole gauge 308 at the opposite end. During operations, fiber optic cable 128 may be used to take measurements within wellbore 122, which may be transmitted to the surface and/or interrogator 124 (e.g., referring to FIG. 1) in the DAS system.

Additionally, within DAS system 150, interrogator 124 may be connected to an information handling system 130 through connection 132, which may be wired and/or wireless. It should be noted that both information handling system 130 and interrogator 124 are disposed on floating vessel 102. Both systems and methods of the present disclosure may be implemented, at least in part, with information handling system 130. Information handling system 130 may comprise any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 130 may be a processing unit 134, a network storage device, or any other suitable device and may vary in size, shape, performance, functionality, and price. Information handling system 130 may comprise random access memory (RAM), one or more processing resources such as a central processing unit (CPU) or hardware or software control logic, ROM, and/or other types of nonvolatile memory. Additional components of the information handling system 130 may comprise one or more disk drives, one or more network ports for communication with external devices as well as an input device 136 (e.g., keyboard, mouse, etc.) and video display 138. Information handling system 130 may also comprise one or more buses operable to transmit communications between the various hardware components.

Alternatively, systems and methods of the present disclosure may be implemented, at least in part, with non-transitory computer-readable media 140. Non-transitory computer-readable media 140 may comprise any instrumentality or aggregation of instrumentalities that may retain data and/or instructions for a period of time. Non-transitory computer-readable media 140 may comprise, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Production operations and sensing operations in a subsea environment present optical challenges for DAS system 150. For example, pulse repetition rate that may be used in DAS system 150 is inversely proportional to fiber length. Additionally, the signal strength decays with distance due to attenuation so the signal strength is approximately inversely proportional with distance. Moreover, the maximum light pulse power that can be launched into the sensing fiber prior to the occurrence of optical nonlinearities such as modulation instability is inversely proportional to the total fiber length, meaning that less light pulse power can be injected in sensing fibers with longer lengths.

Therefore, the quality of the overall signal is poorer with a longer fiber than a shorter fiber. This may impact any operation that may utilize DAS system 150 since the distal end of the fiber contains the interval of interest (i.e., the reservoir) in which fiber optic cable 128 may be deployed. The interval of interest may comprise wellbore 122 and formation 104. For pulsed DAS systems 150 such as the one exemplified in FIG. 1, an additional challenge is the drop in signal-to-noise ratio (SNR) associated with the decrease in the number of light pulses that may be launched into the fiber per second (pulse rate) when interrogating fibers with overall lengths exceeding 10 km. As such, utilizing DAS system 150 in a subsea environment may have to increase the returned signal strength with given pulse power, increase the maximum pulse power that may be used for given fiber optic cable length, maintain the pulse power as high as possible as it propagates down the fiber optic cable length, and increase the number of light pulses that may be launched into the fiber optic cable per second. It is only possible to increase these parameters up to the limit of physics, which limits system performance in various applications.

As illustrated in FIGS. 3A-3D, fiber optic sensing is used for various sensing applications in the oil & gas industry. Fiber optic cable 128, illustrated in FIGS. 3A-3D, may comprise any number of sensors that may be point sensors either at the surface and/or down-hole. Single point or multi-point pressure/temperature sensors may be used in reservoir monitoring applications, where the pressure sensors may be capable of collecting data at rates up to 2,000 Hz or even higher.

In examples, fiber optic cables 128 may house one or several optical fibers and the optical fibers may be single mode fibers, multi-mode fibers or a combination of single mode and multi-mode optical fibers. One or more of the optical fibers deployed in the sensing region of interest may be an optically enhanced fiber with increased Rayleigh backscattering characteristics when compared to normal single mode optical fibers. The increased Rayleigh backscattering characteristics may be due to perturbations of the refractive index in the optical fiber. The fiber optic sensing systems connected to the optical fibers may comprise Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber/cable, or single point sensing systems where the sensors are located at the end of the cable.

During operations, fiber optic sensing systems may operate using various sensing principles like Rayleigh scattering, Brillouin scattering, Raman scattering, and/or the like. Raman scattering may comprise, but is not limited to, amplitude-based sensing systems like DTS systems. Phase sensing-based systems like DAS systems 150 (e.g., referring to FIG. 1) may operate with interferometric sensing using homodyne or heterodyne techniques where the system may sense phase or intensity changes due to constructive or destructive interference. Strain sensing systems like DSS may use dynamic strain measurements based on interferometric sensors or static strain sensing measurements using Brillouin scattering. Quasi-distributed sensors may be based on Fiber Bragg Gratings (FBGs) where a wavelength shift is detected or multiple FBGs are used to form Fabry-Perot type interferometric sensors for phase or intensity based sensing, or single point fiber optic sensors based on Fabry-Perot or FBG or intensity-based sensors.

True Distributed Fiber Optic Sensing (DFOS) systems may operate based on Optical Time Domain Reflectometry (OTDR) principles or Optical Frequency Domain Reflectometry (OFDR). OTDR based systems may be pulsed where one or more optical pulses may be transmitted down an optical fiber and backscattered light (Rayleigh, Brillouin, Raman etc.) is measured and processed. Time of flight for the optical pulse(s) indicate where along the optical fiber the measurement is done. OFDR based systems operate in continuous wave (CW) mode where a tunable laser is swept across a wavelength range, and the back scattered light is collected and processed.

Fiber optic cables 128 may further comprise various hybrid approaches where single point or quasi-distributed or distributed fiber optic sensors are mixed with electrical sensors. Therefore, fiber optic cable 128 may then comprise optical fiber and electrical conductors. Electrical sensors may be pressure sensors based on quarts type sensors or strain gauge-based sensors or other commonly used sensing technologies. Pressure sensors, optical or electrical, may be housed in dedicated gauge mandrels or attached outside the casing in various configurations for down-hole deployment or deployed conventionally at the surface well head or flow lines.

Temperature measurements from a DTS system may be used to determine locations for water injection applications where fluid inflow in the treatment well as well as the fluids from the surface are likely to be cooler than formation temperatures. During operations, a DTS warm-back analysis may be utilized to determine fluid volume placement, this is often done for water injection wells and the same technique may be used for fracturing fluid placement. Temperature measurements in observation wells may be used to determine fluid communication between the treatment well and observation well, or to determine formation fluid movement.

DAS data may be used to determine fluid allocation in real-time as acoustic noise is generated when fluid flows through the casing and in through perforations into the formation. Phase and intensity based interferometric sensing systems may be sensitive to temperature and mechanical as well as acoustically induced vibrations. DAS data may be converted from time series data to frequency domain data using Fast Fourier Transforms (FFT) and other transforms like wavelet transforms may also be used to generate different representations of the data. Various frequency ranges may be used for different purposes. In examples, low frequency signal changes may be attributed to formation strain changes or temperature changes due to fluid movement and other frequency ranges may be indicative of fluid or gas movement. Various filtering techniques and models may be applied to generate indicators of events that may be of interest. Indicators may comprise formation movement due to growing natural fractures, formation stress changes during the fracturing operations and this effect may also be called stress shadowing. During operations, fluid seepage may be sensed by fiber optic cables during a fracturing operation as formation movement may force fluid into and observation well. This may comprise, but is not limited to, fluid flow from fractures, and/or fluid and proppant flow from frac hits. Each indicator may have a characteristic signature in terms of frequency content and/or amplitude and/or time dependent behavior, and these indicators may be. These indicators may also be present at other data types and not limited to DAS data. Fiber optic cables used with DAS systems may comprise enhanced back scatter optical fibers where the Rayleigh backscatter may be increased by 10× or more with associated increase in Optical Signal to Noise Ratio (OSNR).

DAS systems 150 (e.g., referring to FIG. 1) may also be used to detect various seismic events where stress fields and/or growing fracture networks generate micro seismic events or where perforation charge events may be used to determine travel time between horizontal wells and this information may be used from stage to stage to determine changes in travel time as the formation is fractured and filled with fluid and proppant. DAS systems 150 may also be used with surface seismic sources to generate Vertical Seismic Profiles (VSPs) before, during and after a fracturing job to determine the effectiveness of the fracturing job as well as determine production effectiveness. VSPs and reflection seismic surveys may be used over the life of a well and/or reservoir to track production related depletion and/or track water, gas, polymer flood fronts, and/or the like.

DSS data may be generated using various approaches and static strain data may be used to determine absolute strain changes over time. Static strain data is often measured using Brillouin based systems or quasi-distributed strain data from FBG based system. Static strain may also be used to determine propped fracture volume by looking at deviations in strain data from a measured strain baseline before fracturing a stage. It may also be possible to determine formation properties like permeability, poroelastic responses and leak off rates based on the change of strain vs time and the rate at which the strain changes over time. Dynamic strain data may be used in real-time to detect fracture growth through an appropriate inversion model, and appropriate actions like dynamic changes to fluid flow rates in the treatment well, addition of diverters or chemicals into the fracturing fluid or changes to proppant concentrations or types may then be used to mitigate detrimental effects.

Fiber Bragg Grating based systems may also be used for a number of different measurements. FBG's are partial reflectors that may be used as temperature and strain sensors or may be used to make various interferometric sensors with very high sensitivity. FBG's may be used to make point sensors or quasi-distributed sensors where these FBG based sensors may be used independently or with other types of fiber optic-based sensors. FBG's may manufactured into an optical fiber at a specific wavelength, and other system like DAS, DSS or DTS systems may operate at different wavelengths in the same fiber and measure different parameters simultaneously as the FBG based systems using Wavelength Division Multiplexing (WDM) and/or Time Division Multiplexing (TDM).

The sensors may be placed in either the treatment well or monitoring well(s) to measure well communication. The treatment well pressure, rate, proppant concentration, diverters, fluids and chemicals may be altered to change the hydraulic fracturing treatment. These changes (i.e., stress fields change) may impact the formation responses in several different ways and this may generate micro seismic effects that may be measured with DAS systems and/or single point seismic sensors like geophones. These sensors may allow for measuring fracture growth rates as they change and this may generate changes in measured micro seismic events and event distributions over time, or changes in measured strain using the low frequency portion or the DAS signal or Brillouin based sensing systems. Pressure changes due to poroelastic effects may be measured in the monitoring well and pressure data may be measured in the treatment well and correlated to formation responses. Thus, various changes in treatment rates and pressure may generate events that may be correlated to fracture growth rates.

Several measurements may be combined to determine adjacent well communication, and this information may be used to change the hydraulic fracturing treatment schedule to generate outcomes. Multiple wells in a field and/or reservoir may be instrumented with optical fibers for monitoring subsurface reservoirs from cradle to grave. Subsurface applications may comprise hydrocarbon extraction, geothermal energy production and/or fluid injection like water or CO2 in CCUS application.

Figure 2:
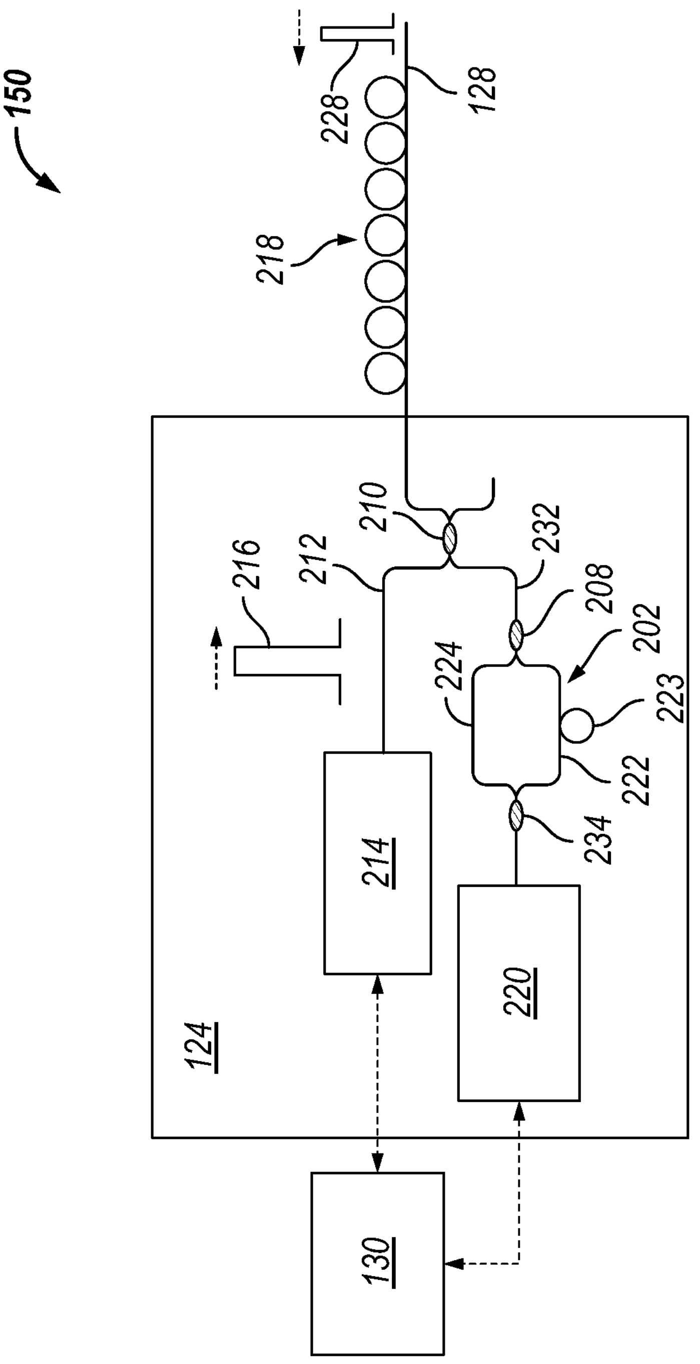
FIG. 2 illustrates an example of a DAS system.

FIG. 2 illustrates an example of DAS system 150. DAS system 150 may comprise information handling system 130 that is communicatively coupled to interrogator 124. Without limitation, DAS system 150 may comprise a single-pulse coherent Rayleigh scattering system with a compensating interferometer. In examples, DAS system 150 may be used for phase-based sensing of events in a wellbore using measurements of coherent Rayleigh backscatter or may interrogate a fiber optic line containing an array of partial or distributed reflectors or fiber core perturbations, for example, fiber Bragg gratings, which provide backscatter cross-sections exceeding the background Rayleigh backscatter limits.

As illustrated in FIG. 2, interrogator 124 may comprise a pulse generator 214 coupled to a first coupler 210 using an optical fiber 212. Pulse generator 214 may be a laser, or a laser connected to at least one amplitude modulator, or a laser connected to at least one switching amplifier, i.e., semiconductor optical amplifier (SOA). First coupler 210 may be a traditional fused type fiber optic splitter, a circulator, a Planar Waveguide Circuit (PLC) fiber optic splitter, or any other type of splitter known to those with ordinary skill in the art. Pulse generator 214 may be coupled to optical gain elements (not shown) to amplify pulses generated therefrom. Example optical gain elements comprise, but are not limited to, Erbium Doped Fiber Amplifiers (EDFAs) or Semiconductor Optical Amplifiers (SOAs).

DAS system 150 may comprise an interferometer 202. Without limitations, interferometer 202 may comprise a Mach-Zehnder interferometer. For example, a Michelson interferometer or any other type of interferometer 202 may also be used without departing from the scope of the present disclosure. Interferometer 202 may comprise a top interferometer arm 224, a bottom interferometer arm 222, and a gauge 223 positioned on bottom interferometer arm 222. Interferometer 202 may be coupled to first coupler 210 through a second coupler 208 and an optical fiber 232. Interferometer 202 further may be coupled to a photodetector assembly 220 of DAS system 150 through a third coupler 234 opposite second coupler 208. Second coupler 208 and third coupler 234 may be a traditional fused type fiber optic splitter, a PLC fiber optic splitter, or any other type of optical splitter known to those with ordinary skill in the art. Photodetector assembly 220 may comprise associated optics and signal processing electronics (not shown). Photodetector assembly 220 may be a semiconductor electronic device that uses the photoelectric effect to convert light to electricity. Photodetector assembly 220 may be an avalanche photodiode or a pin photodiode but is not intended to be limited to such.

When operating DAS system 150, pulse generator 214 may generate a first optical pulse 216 which is transmitted through optical fiber 212 to first coupler 210. First coupler 210 may direct first optical pulse 216 through a fiber optic cable 128. It should be noted that fiber optic cable 128 may be comprised in umbilical line 126 and/or fiber optic cable 128 (e.g., FIG. 1). As illustrated, fiber optic cable 128 may be coupled to first coupler 210. As first optical pulse 216 travels through fiber optic cable 128, imperfections in fiber optic cable 128 may cause a portion of the light to be backscattered along fiber optic cable 128 due to Rayleigh scattering. Scattered light according to Rayleigh scattering is returned from every point along fiber optic cable 128 along the length of fiber optic cable 128 and is shown as backscattered light 228 in FIG. 2. This backscatter effect may be referred to as Rayleigh backscatter. Density fluctuations in fiber optic cable 128 may give rise to energy loss due to the scattered light, $\alpha_{scat}$, with the following coefficient:

$$\alpha_{scat} = \frac{8\pi^3}{3\lambda^4} n^8 p^2 k T_f \beta \tag{1}$$

where n is the refractive index, p is the photoelastic coefficient of fiber optic cable 128, k is the Boltzmann constant, and β is the isothermal compressibility. $T_f$ is a fictive temperature, representing the temperature at which the density fluctuations are “frozen” in the material. Fiber optic cable 128 may be terminated with a low reflection device (not shown). In examples, the low reflection device (not shown) may be a fiber coiled and tightly bent to violate Snell’s law of total internal reflection such that all the remaining energy is sent out of fiber optic cable 128, via macrobending.

Backscattered light 228 may travel back through fiber optic cable 128, until it reaches second coupler 208. First coupler 210 may be coupled to second coupler 208 on one side by optical fiber 232 such that backscattered light 228 may pass from first coupler 210 to second coupler 208 through optical fiber 232. Second coupler 208 may split backscattered light 228 based on the number of interferometer arms so that one portion of any backscattered light 228 passing through interferometer 202 travels through top interferometer arm 224 and another portion travels through bottom interferometer arm 222. Therefore, second coupler 208 may split the backscattered light from optical fiber 232 into a first backscattered pulse and a second backscattered pulse. The first backscattered pulse may be sent into top interferometer arm 224. The second backscattered pulse may be sent into bottom interferometer arm 222. These two portions may be re-combined at third coupler 234, after they have exited interferometer 202, to form an interferometric signal.

Interferometer 202 may facilitate the generation of the interferometric signal through the relative phase shift variations between the light pulses in top interferometer arm 224 and bottom interferometer arm 222. Specifically, gauge 223 may cause the length of bottom interferometer arm 222 to be longer than the length of top interferometer arm 224. With different lengths between the two arms of interferometer 202, the interferometric signal may comprise backscattered light from two positions along fiber optic cable 128 such that a phase shift of backscattered light between the two different points along fiber optic cable 128 may be identified in the interferometric signal. The distance between those points L may be half the length of the gauge 223 in the case of a Mach-Zehnder configuration, or equal to the gauge length in a Michelson interferometer configuration.

While DAS system 150 is running, the interferometric signal will typically vary over time. The variations in the interferometric signal may identify strains in fiber optic cable 128 that may be caused, for example, by seismic energy. By using the time of flight for first optical pulse 216, the location of the strain along fiber optic cable 128 and the time at which it occurred may be determined. If fiber optic cable 128 is positioned within a wellbore, the locations of the strains in fiber optic cable 128 may be correlated with depths in the formation in order to associate the seismic energy with locations in the formation and wellbore.

To facilitate the identification of strains in fiber optic cable 128, the interferometric signal may reach photodetector assembly 220, where it may be converted to an electrical signal. The photodetector assembly may provide an electric signal proportional to the square of the sum of the two electric fields from the two arms of the interferometer. This signal is proportional to:

$$P(t)=P_1+P_2+2*\mathrm{Sqrt}(P_1P_2)\cos(\phi_1\phi_2) \quad (2)$$

where $P_n$ is the power incident to the photodetector from a particular arm (1 or 2) and $\phi_n$ is the phase of the light from the particular arm of the interferometer. Photodetector assembly 220 may transmit the electrical signal to information handling system 130, which may process the electrical signal to identify strains within fiber optic cable 128 and/or convey the data to a display and/or store it in computer-readable media. Photodetector assembly 220 and information handling system 130 may be communicatively and/or mechanically coupled. Information handling system 130 may also be communicatively or mechanically coupled to pulse generator 214.

Modifications, additions, or omissions may be made to FIG. 2 without departing from the scope of the present disclosure. For example, FIG. 2 shows a particular configuration of components of DAS system 150. However, any suitable configurations of components may be used. For example, pulse generator 214 may generate a multitude of coherent light pulses, optical pulse 216, operating at distinct frequencies that are launched into the sensing fiber either simultaneously or in a staggered fashion. For example, the photo detector assembly is expanded to feature a dedicated photodetector assembly for each light pulse frequency. In examples, a compensating interferometer may be placed in the launch path (i.e., prior to traveling down fiber optic cable 128) of the interrogating pulse to generate a pair of pulses that travel down fiber optic cable 128. In examples, interferometer 202 may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 223 of FIG. 1) may be used to delay one of the pulses. To accommodate phase detection of backscattered light using DAS system 150, one of the two branches may comprise an optical frequency shifter (for example, an acousto-optic modulator) to shift the optical frequency of one of the pulses, while the other may comprise a gauge length. This may allow using a single photodetector receiving the backscatter light to determine the relative phase of the backscatter light between two locations by examining the heterodyne beat signal received from the mixing of the light from different optical frequencies of the two interrogation pulses. In another example of DAS system 150, pulse generator 214 may be configured to output a frequency modulated light pulse that has been chirped over several GHz e.g., in a linear fashion. This allows for longer optical light pulses (more light energy) being launched into the sensing fiber when compared to DAS systems 150 that output monochromatic light pulses. Chirp compression techniques as typically used in radar applications can then be applied to the detected back-reflected signal to compress the chirped signal back into a short pulse to improve spatial resolution.

In examples, DAS system 150 may generate interferometric signals for analysis by the information handling system 130 without the use of a physical interferometer. For instance, DAS system 150 may direct backscattered light to photodetector assembly 220 without first passing it through any interferometer, such as interferometer 202 of FIG. 2. Alternatively, the backscattered light from the interrogation pulse may be mixed with the light from the laser originally providing the interrogation pulse. Thus, the light from the laser, the interrogation pulse, and the backscattered signal may all be collected by photodetector 220 and then analyzed by information handling system 130. The light from each of these sources may be at the same optical frequency in a homodyne phase demodulation system or may be different optical frequencies in a heterodyne phase demodulator. This method of mixing the backscattered light with a local oscillator allows measuring the phase of the backscattered light along the fiber relative to a reference light source.

Fiber optic cables 128 (e.g., referring to FIG. 1), connectors and signal routing components all have optical attenuation. Fiber optic interrogators used for fiber optic sensing and reservoir monitoring have an optical dynamic range, or Optical Signal to Noise Ratio (OSNR), defined by the maximum signal power that may be launched into a sensing system (transmission fiber, sensing fiber, sensors) and the noise floor of the sensing system.

The maximum signal power that may be launched into an optical fiber may be limited by the optical source, and this may sometimes be overcome by using optical amplifiers like Erbium Doped Fiber Amplifiers (EDFAs), where the signal amplitude is increased. EDFAs are opto-electric devices with power supplies, electronics and specialty optics packaged into bench-top enclosures, or rack mount enclosures or miniaturized so that they may be comprised in as sub-components of other electrical systems.

Other limitations of the maximum signal power may comprise thermal damage to connectors or other optical components commonly used in routing optical signals. Free-space optics and lenses are used to build micro-optic components like optical isolators, Wavelength Division Multiplexers (WDMs), filters, circulators, and/or the like, which may be used to route signals in a directional fashion. Any point in the system where the optical signal exits/enters the optical fiber may be a point of concern where thermal damage due to high optical power levels may occur.

Yet other limitations comprise non-linear fiber transmission penalties like Stimulated Brillouin Scattering (SBS), Stimulated Raman Scattering (SRS), Kerr-effect related phenomena like Self-Phase Modulation (SPM), Cross-Phase Modulation (XPM), modulation instability, soliton formation or Four Wave Mixing (FWM). The non-linear effects may be influenced by a number of parameters such as fiber dispersion, fiber effective area, channel spacing in WDM systems, signal intensity and source line width.

The noise floor and system SNR may in many instances be limited by interrogator system design, photo detector noise, optical component losses, and/or the like. The use of EDFAs must also be considered and optimized as both signal and noise are amplified, and small signal gain is typically higher than large signal gain. Optical component losses prior to the gain element in the EDFA may also decrease the signal to noise. As a device, EDFA's are characterized by Noise Figure (NF) which is a measure of the degradation of the SNR. For example, if the signal is amplified the noise may be amplified even more and the losses prior to the gain element may reduce the signal amplitude so the actual SNR may be reduced.

Another challenge with pulsed sensing systems like Distributed Temperature Sensing (DTS), Distributed Acoustic Sensing (DAS) and Distributed Strain Sensing (DSS) systems is that only one signal at a given wavelength may propagate through the sensing region of the sensing fiber at any given time in order to prevent back-scattered light from multiple locations along the sensing fiber from returning to the respective distributed sensing systems at the same time. This limits the pulse repetition rate in optical systems, which in turn limits the frequency content of signals as well as the amount of averaging of signals that may be done for any given time period.

Figure 4:
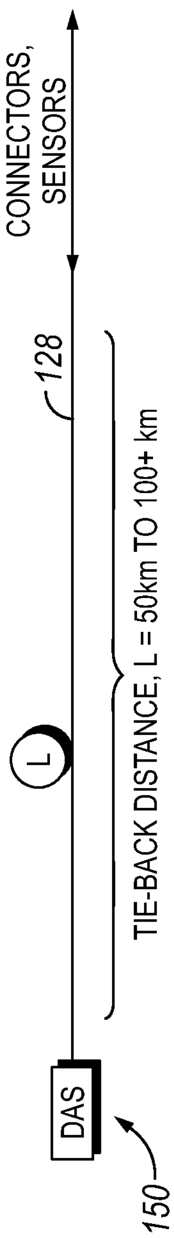
FIG. 4 illustrates an example of a DAS system with an extended length of fiber optic cable.

FIG. 4 illustrates an example of a DAS system 150 with an extended length of fiber optic cable 128. Assuming a refractive index of 1.5 of fiber optic cable 128, the two-way travel time of light in a fiber is about 10 ns/m. Thus, for the reasons outlined above, for a 5 km long fiber optic cable 128, it is necessary to wait at least 50 µs before the next light pulse may be launched into fiber optic cable 128, which may be operating as a sensing fiber. This is equivalent to a maximum sampling rate of the fiber optic sensing system of 20 kHz or a bandwidth of 10 kHz. If the length of fiber optic cable 128 were to increase to 25 km, the maximum attainable sampling rate (interval) drops to 5 kHz (250 µs) or 2.5 kHz bandwidth. This dependency of length of fiber optic cable 128 and pulse repetition rate is illustrated in FIGS. 5A and 5B.

Figure 5A:
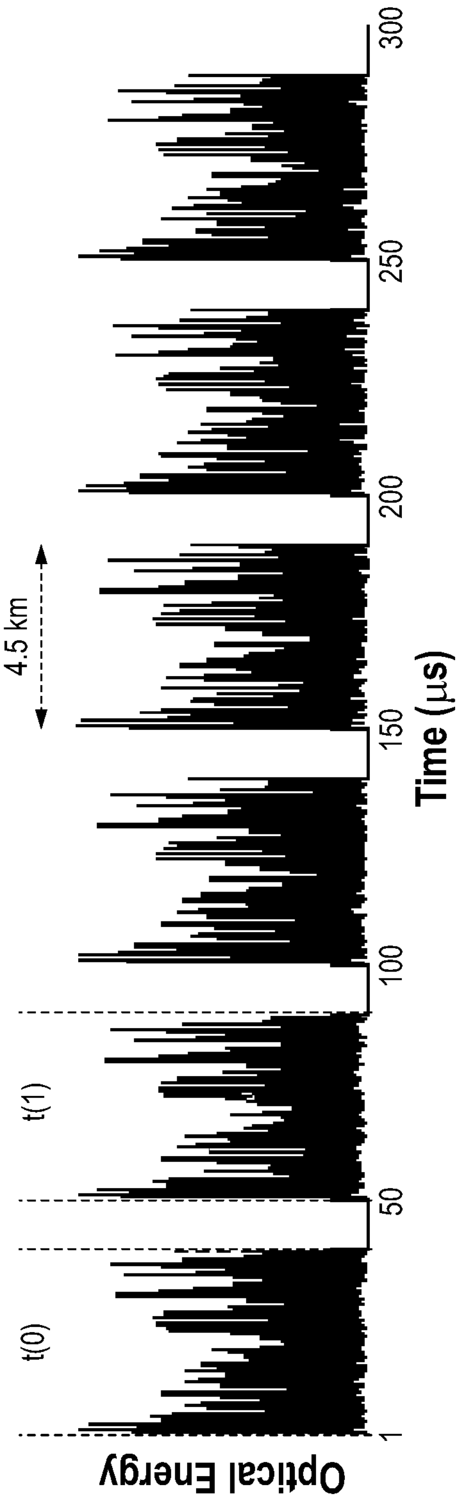
FIGS. 5A and 5B are two graphs which are compared to show optical backscattered energy as a function of time.
Figure 5B:
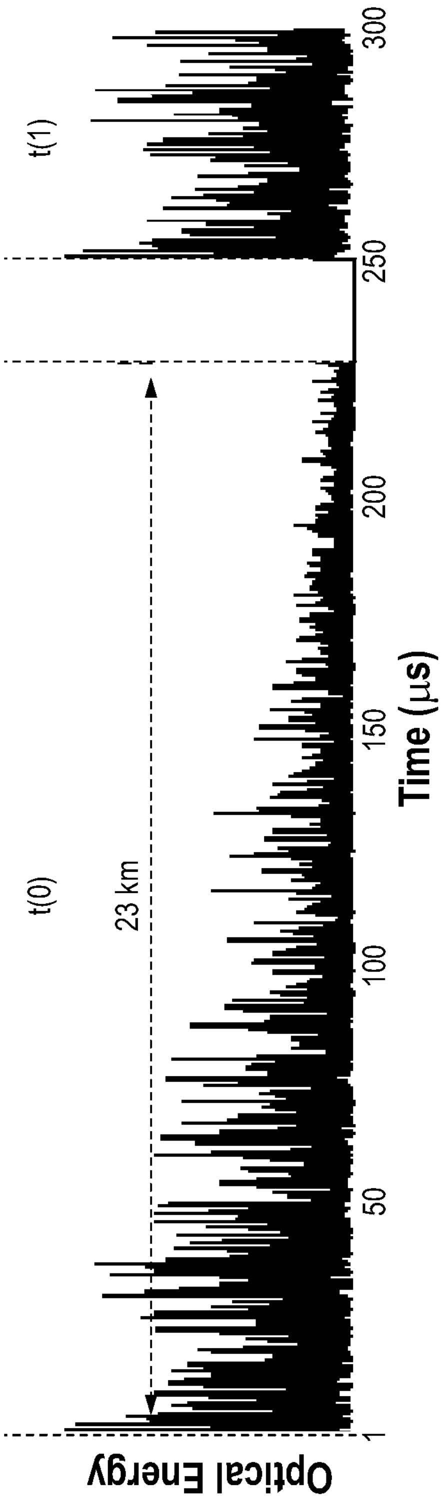

FIGS. 5A and 5B are two graphs which are compared to show optical backscattered energy as a function of time for a 4.5 km sensing region 500, in view of FIG. 5A, and a 23 km long sensing region, in view of FIG. 5B, for a sensing fiber 710, discussed below. A sensing region is defined as a selected location along sensing fiber 710 in which measurements are taken. In examples, the selected location may further be defined as the area between two selected points along sensing fiber 710. This may for a length that may range from less than an inch to more than ten inches. Additionally, sensing region 500 may have instruments attached to it. These instruments may take measurements that are transferred as data along sensing fiber 710 and fiber optic cable 128 back to a receiver 902, discussed below.

Figure 6:
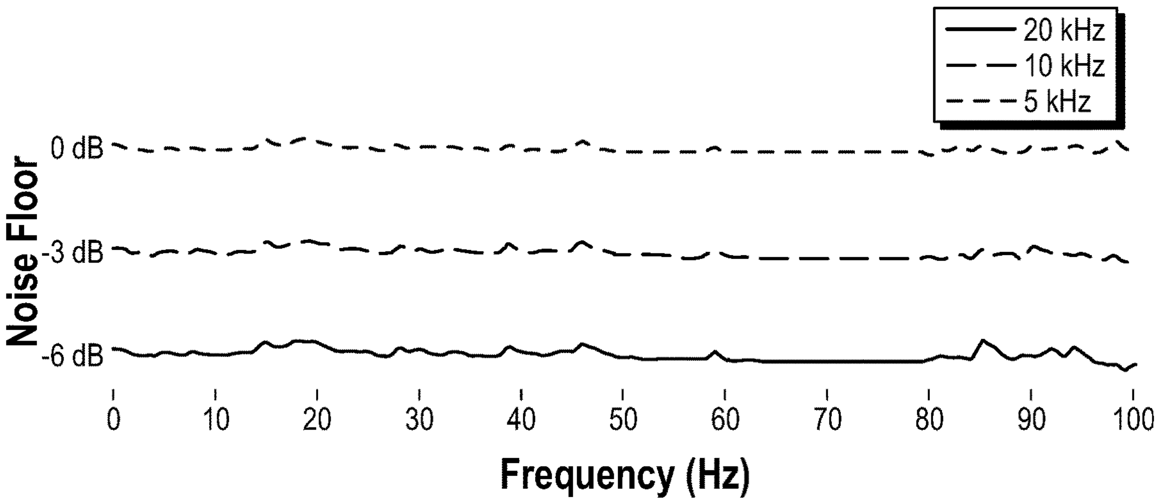
FIG. 6 is a graph that shows the DAS noise floor for frequencies between 0 and 100 Hz.

Light pulses are launched into the 4.5 km sensing region 500 and 23 km sensing region 500 of sensing fiber 710 every 50 µs and 250 µs, respectively, ensuring that at any time only one light pulse is contained within sensing fiber 710 and/or fiber optic cable 128 (e.g., referring to FIG. 1). During measurement operations, a sampling rates of less than 5 kHz may not be sufficient for DAS applications that rely on broadband acoustic responses, such as discriminating between different flow regimes and/or detecting sand ingress. Moreover, this sampling rate limitation also affects the data quality of other, low(er) bandwidth DAS applications such as Vertical Seismic Profiling (VSP) where the highest frequency of interest typically does not exceed 100 Hz. This is because the intricate sampling scheme of DAS systems 150 (e.g., referring to FIG. 1) blends spatial and temporal samples into a single 1D data stream preventing the meaningful use of antialiasing filters prior to analog-to-digital conversion. This in turn causes noise that occurs at frequencies above the Nyquist frequency to be folded back into the sub-Nyquist frequency band. This effect is further illustrated in FIG. 6. FIG. 6 is a graph that shows the DAS noise floor for frequencies between 0 and 100 Hz when using different DAS pulse repetition rates. FIG. 6 illustrates a noise floor for a DAS system between 0 and 100 Hz for three different DAS sampling frequencies. The graph illustrates that OSNR is improved by 3 dB for every doubling in pulse repetition rate.

Methods and system discussed below overcome and actively mitigate issues faced over longer fiber optic cables 128 (e.g., referring to FIG. 4). As discussed below, this is achieved by creating a largely loss-less transmission fiber span using a combination of distributed and point gain elements strategically placed in the overall system architecture. This turns long transmission fiber lengths virtually invisible from a sensing system perspective while maintaining a high Optical Signal to Noise Ratio (OSNR)

To overcome issues faced by longer fiber optic cables 128 (e.g., referring to FIG. 4), a DAS system 150 may utilize remotely supported/remote pumped optical gain elements in existing fiber optic cables 128 located in umbilical lines, flow lines, communication cables to overcome distributed fiber losses and point losses due to connectors, splices, and/or the like. This should negate inherent system losses that may limit the ability to extend the reach of applications both onshore and offshore. DAS system 150 may comprise system gain monitoring capabilities where signals may be measured at transmission and receiving points as well as injected at dedicated points on demand to measure backscattered Rayleigh components over distance thus enabling distributed gain monitoring, control, and automation.

Figure 7:
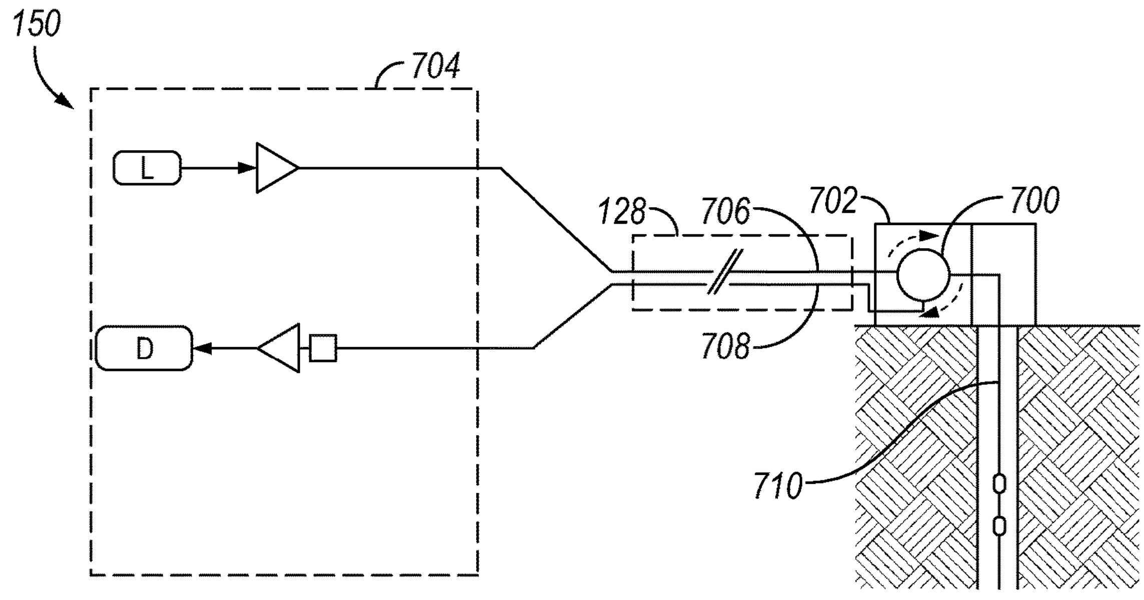
FIG. 7 illustrates one example in which DAS system may prevent optical noise events caused by strong reflections.

FIG. 7 illustrates one example in which DAS system 150 may prevent optical noise events caused by strong reflections (e.g., poorly mated connectors) occurring within fiber optic cable 128 between surface processing equipment and wellhead to reach noise-sensitive optical components within the surface processing equipment 704. As illustrated, fiber optic cable may comprise a transmission fiber 706 and a return fiber 708. Preventing optical noise may be achieved by placing a circulator 700 in close proximity of wellhead 702. Circulators are free-space optical components with a certain amount of optical attenuation. Circulators are passive optical devices. Passive optical devices are devices that are optically connected to a fiber optic cable to receive and direct light (e.g., light pulses) along the fiber optic cable to at least another fiber optic cable connected to the passive optical device. Although circulators are described herein for this disclosure, any suitable passive optical device may be utilized in place of the circulator. Examples of suitable passive optical devices comprise a fused type fiber optic splitter, a Planar Waveguide Circuit (PLC) fiber optic splitter, or any other type of optical splitter. Additionally, DAS system 150 may overcome the sampling rate limitation of traditional pulsed fiber-optic sensing systems in extended reach scenarios, which may be performed by placing a downhole sensing fiber 710 after circulator 700 which in turn enables similar pulse repetition rates than in scenarios where the surface processing equipment is placed in immediate proximity of wellhead 702.

Figure 8:
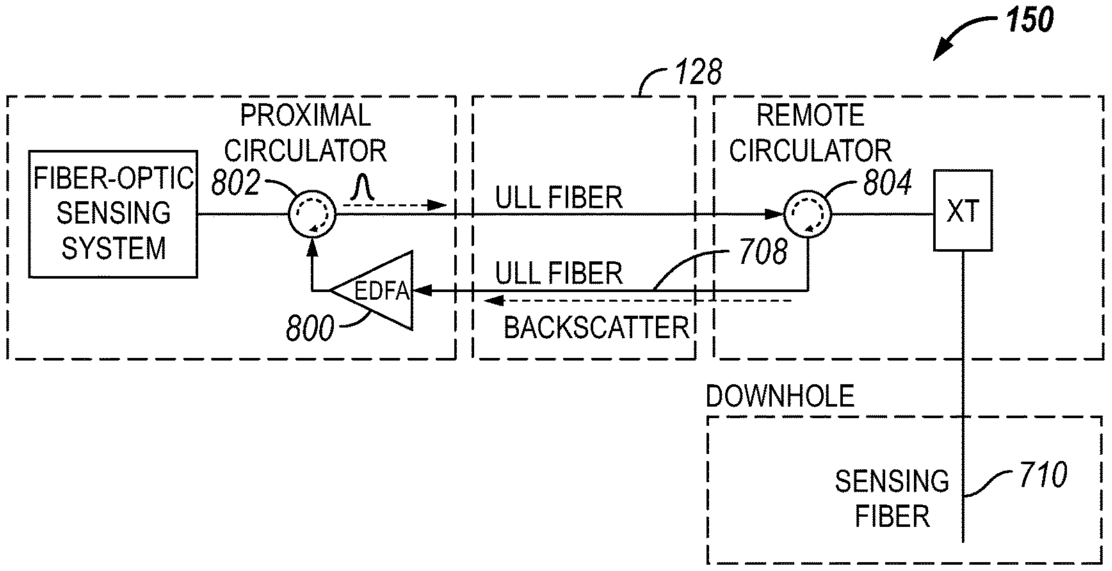
FIG. 8 illustrates an example that utilizes an optical amplifier placed in the upgoing fiber optic cable just prior to proximal circulator.

FIG. 8 illustrates DAS system 150 that overcomes sampling rate limitations of traditional pulsed fiber-optic sensing systems. As illustrated, an optical amplifier 800 is placed in return fiber 708 of fiber optic cable 128 just prior to a proximal circulator 802 to selectively amplify the backscattered light originating from downhole sensing fiber 710, and from distal circulator 804. This example may allow for an increase in sampling rates over traditional pulsed fiber-optic sensing systems.

Figure 9:
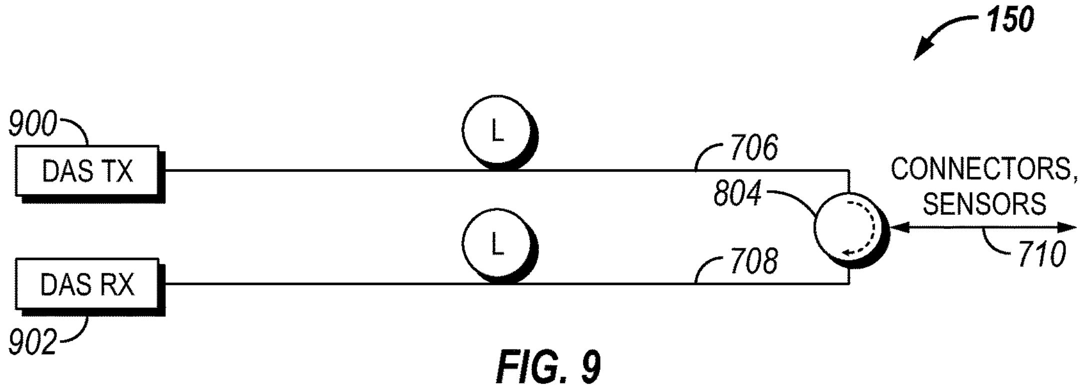
FIG. 9 illustrates an example in which launch arm and receiver arm of DAS system may be de-coupled.

FIG. 9 illustrates an example in which transmission fiber 706 and return fiber 708 of DAS system 150 may be de-coupled. In this example proximal circulator 802 (e.g., referring to FIG. 8) is omitted. Omission of proximal circulator 802 (e.g., referring to FIG. 8) may eliminate the point loss introduced by proximal circulator 802 without limiting or departing from the scope of solutions introduced in this disclosure to overcome the losses accrued in extended reach systems. However, transmission fiber 706 and return fiber 708 are attached to distal circulator 804. Additionally, downhole fiber 710 is attached to distal circulator 804. As illustrated, transmission fiber 706 may be connected to a transmitter 900 and return fiber 708 may be connected to receivers 902. It should be noted that all transmitters discussed above or below may be any number of sensing systems that work together or individually. Sensing systems may comprise DAS systems, B-DTS systems, DTS systems, Raman systems, and/or the like. Respectively, the systems may operate utilizing a Rayleigh scattering measurement, a Brillouin scatter measurement, or a Raman scattering measurement. Transmitter 900 may utilize a narrow linewidth continuous wave (CW) laser followed by a gating mechanism, for example, a shutter (switch, Semiconductor Optical Amplifier (SOA) or similar) to create a short pulse. The pulse may be amplified using an EDFA or SOA. Similarly, a pulsed laser may be used and the laser pulse may be amplified using and EDFA or SOA. The transmitter assembly may comprise filters to remove Amplified Spontaneous Emission (ASE) from the gain elements (SOA, EDFA etc.). In a OFDR based systems, a swept wavelength or tunable laser followed by an amplifier (SOA/EDFA) may be utilized. Additionally, in an OTDR based systems, a pulsed laser source may be utilized as transmitters (or transmitter assemblies).

Receivers 902 or receiver assemblies may be an opto-electric device that converts photons/optical light into electrons/electric signal with suitable optical and electrical amplification and filtering. Examples of optical to electrical conversion devices comprise various photo diodes, avalanche photodiodes, photo-multiplier tubes/assemblies etc. Optical amplification may comprise of EDFA's and SOA's, optical filtering may comprise of WDM's and ASE filters, electrical amplification would be done using various low noise amplifiers and may comprise hardwired filtering to eliminate out of band signals, followed by additional signal processing and filtering once in the electrical/digital domain.

Figure 10:
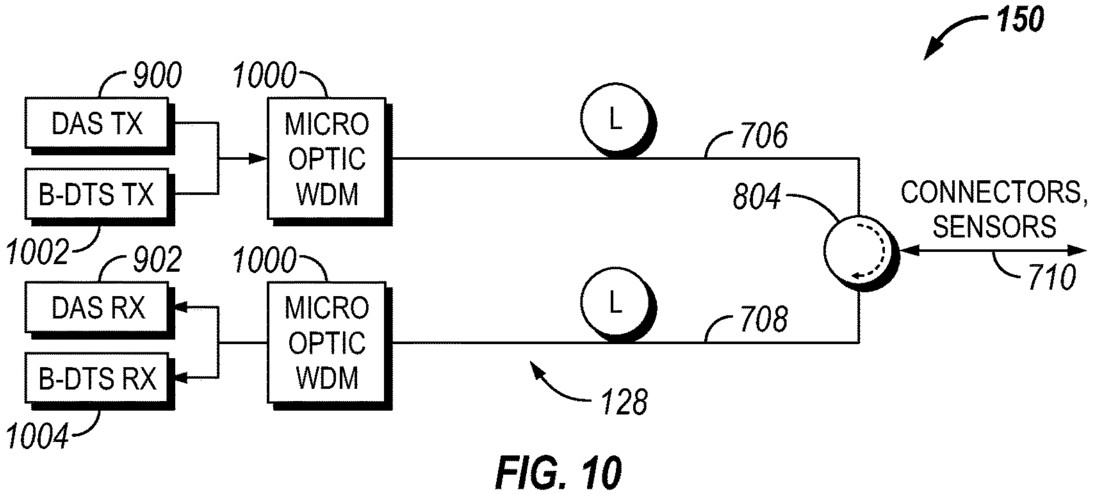
FIG. 10 further illustrates DAS system with Brillouin DTS.

FIG. 10 further illustrates DAS system 150 in which transmission fiber 706 and a return fiber 708 are each connected to a micro-optic wavelength divisional multiplexer (WDM) 1000. Although a micro-optic WDM is illustrated here, any WDM may be utilized, such as a fused fiber WDM, splitter, and/or the like. Micro-optic WDM 1000 comprises of one or more interference optical filters which may accommodate very closely spaced optical channels or wavelengths on the order of 0.4 nm (50 GHz) spacing or better. In examples, micro-optic WDM 1000 may function and operate to guide and direct optical signals, and to filter out-of-band signals. WDM's may combine and/or split optical signals based on the wavelength of the optical signals. WDM's may provide low loss signal paths for select wavelength bands while attenuating other wavelength bands. WDMs may often be the most efficient (low loss, high isolation to undesired signals) way to route and guide signals. Other devices may be utilized to perform similar functions using other components where the optical attenuation may be higher and where the optical attenuation may be overcome by using additional optical amplification. As illustrated, micro-optic WDM 1000 may connect transmission fiber 706 to Brillouin DTS transmitter 1002 and transmitter 900. Additionally, micro-optic WDM 1000 may connect return fiber 708 to Brillouin DTS receiver 1004 and receiver 902. Brillouin DTS transmitter 1002 and Brillouin DTS receiver 1004 may function and operate to form a complete Brillouin interrogator system as the electrical control signals to Brillouin DTS transmitter 1002 may come from an information handling system 130. Additionally, the electrical signals from the Brillouin receiver may be collected by the same computer controlling the Brillouin DTS transmitter 1002. Other computing and control devices may be used in any combination with information handling system 130. It is understood that any transmitter 900 and/or receiver 902 circuit may be connected to an information handling system 130 for command and control as well as data acquisition and processing in order to form a complete system. Other systems and methods may comprise Raman power routing with lower loss through fiber optic cable 128.

Figure 11:
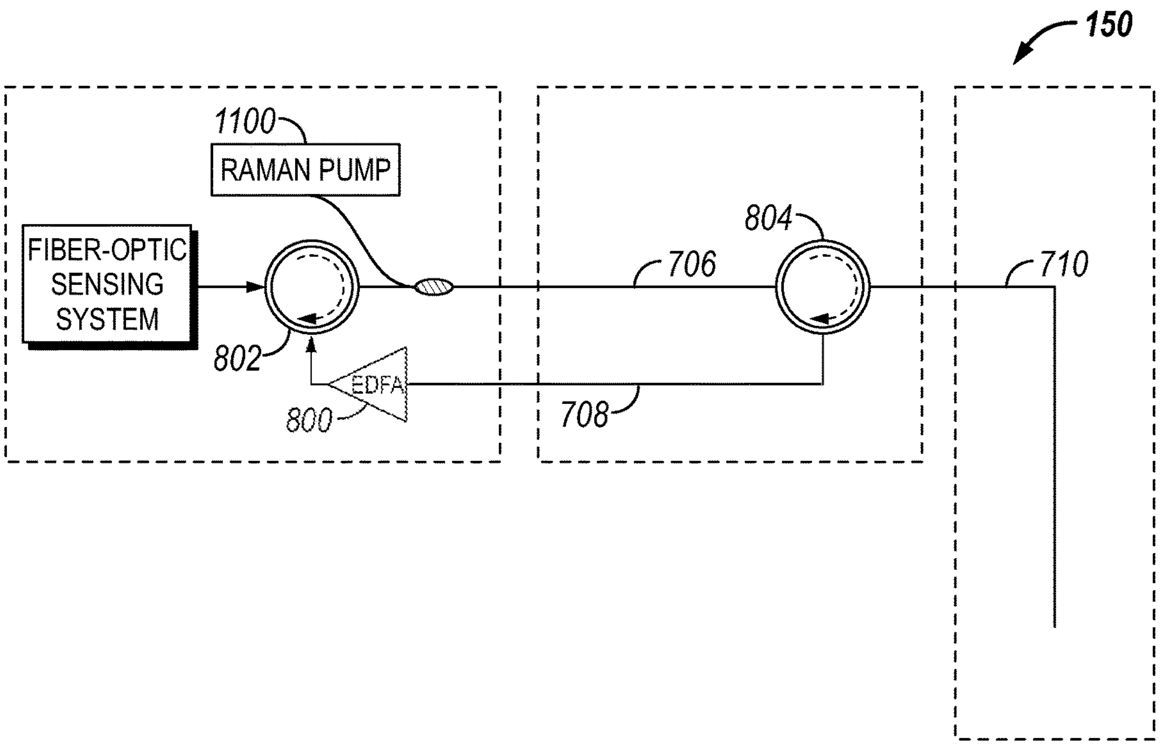
FIG. 11 illustrates an example that uses co-pumped Raman amplification.

FIG. 11 comprises all devices from FIG. 8 and further an example in which a co-pumped Raman amplification is utilized in DAS system 150. In this example, a Raman pump 1100 is used to co-propagate Raman pump light with the downward traveling light signals in transmission fiber 706 in order to mitigate optical attenuation at the light signal wavelengths. In examples, Raman amplification may be used in a counter propagating mode for the signals returning to the surface through return fiber 708 from distal circulator 804. In other examples, methods and systems may re-route Raman pump light in order to use any remnant Raman pump optical power to amplify any signals being routed to the surface.

Figure 12:
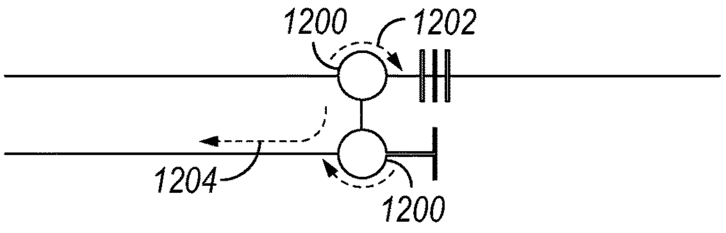
FIG. 12 illustrates the routing the remnant Raman pump power as the light goes through two circulators.

FIG. 12 illustrates an example in which distal circulator 804 (e.g., referring to FIG. 11) is replaced with two circulators. This may allow for routing the remnant Raman pump power as the light goes through two circulators 1200 with a downward pass 1202 and an upward pass 1204 for each circulator 1200 at a loss of 0.8 dB-1 dB each way, a filter and a reflective element resulting in 4-5 dB of optical loss.

Figure 13:
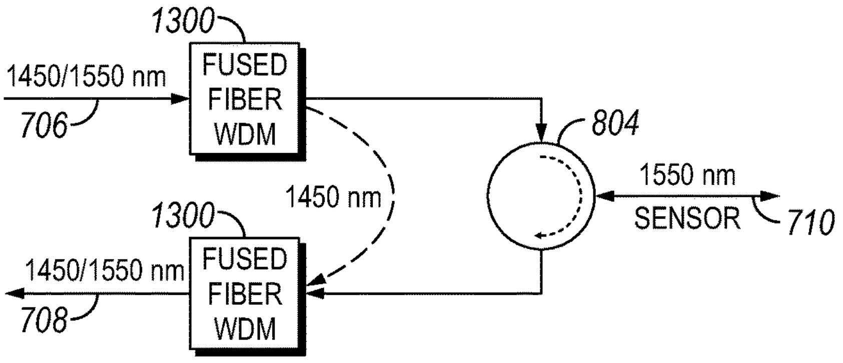
FIG. 13 illustrates the same functionality may be achieved by low loss fused fiber components and a circulator.

FIG. 13 illustrates the same functionality may be achieved by Low Loss Fused Fiber WDMs 1300 (referred to a fused fiber WDM 1300) and distal circulator 804. Although a fused fiber WDM is illustrated, any WDM may be utilized, such as a micro-optic WDM, splitter, and/or the like. Fused fiber WDMs 1300 added within an optical circuit may be used to steer pump laser light (e.g., 1450 nm) away from distal circulator 804 and a bidirectional downhole sensing fiber 710. A matched pair of fused fiber WDM 1300 may allow an effective pump light bypass to reuse excess remaining pump light along the return fiber 708 from transmission fiber 706. Thus, recirculation of high power pump light through return fiber 708, which may prevent potential high power pump light induced damage to distal circulator 804 and/or subsea and well head connectors. The 1450 nm Raman pump wavelength may experience maximum 0.3 dB optical attenuation through each fused fiber WDM 1300 for a total loss of less than 0.6 dB. Similarly, the 1550 nm signal may pass through distal circulator 804, thus experiencing about 2 dB of optical attenuation.

Figure 14:
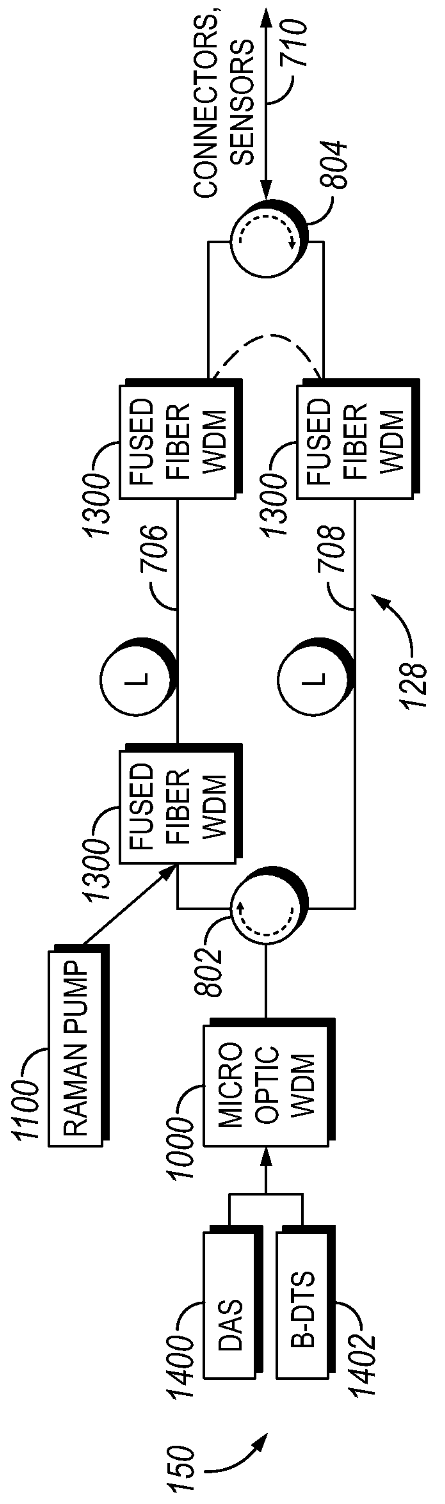
FIG. 14 illustrates an example of Raman amplification that utilizes two or more WDMs.

FIG. 14 illustrates an example of Raman amplification that utilizes two or more fused fiber WDMs 1300 with a Raman pump 1100 (as discussed above). Fused fiber WDMs 1300 are broadband WDMs which cannot support close channel spacing but provides relatively low optical attenuation. Additionally, FIG. 14 illustrates DAS system 150 connects transmission fiber 706 and return fiber 708 using proximal circulator 802 (e.g., referring to FIG. 8). Thus, fiber optic cable 128 is no longer de-coupled as discussed in FIGS. 9 and 10. Proximal circulator 802 is connected to a micro-optic WDM 1000, discussed above, which comprises interference optical filters which may accommodate very closely space optical channels or wavelengths on the order of 0.4 nm (50 GHz) spacing or better if/when needed. Fused fiber WDMs 1300 are in general lower loss components when compared with micro-optic WDM's 1000 and may handle higher optical powers without optically and/or thermally induced damage. Further, micro-optic WDM 1000 is connected to DAS 1400 and Brillouin DTS (B-DTS) 1402.

Figure 15:
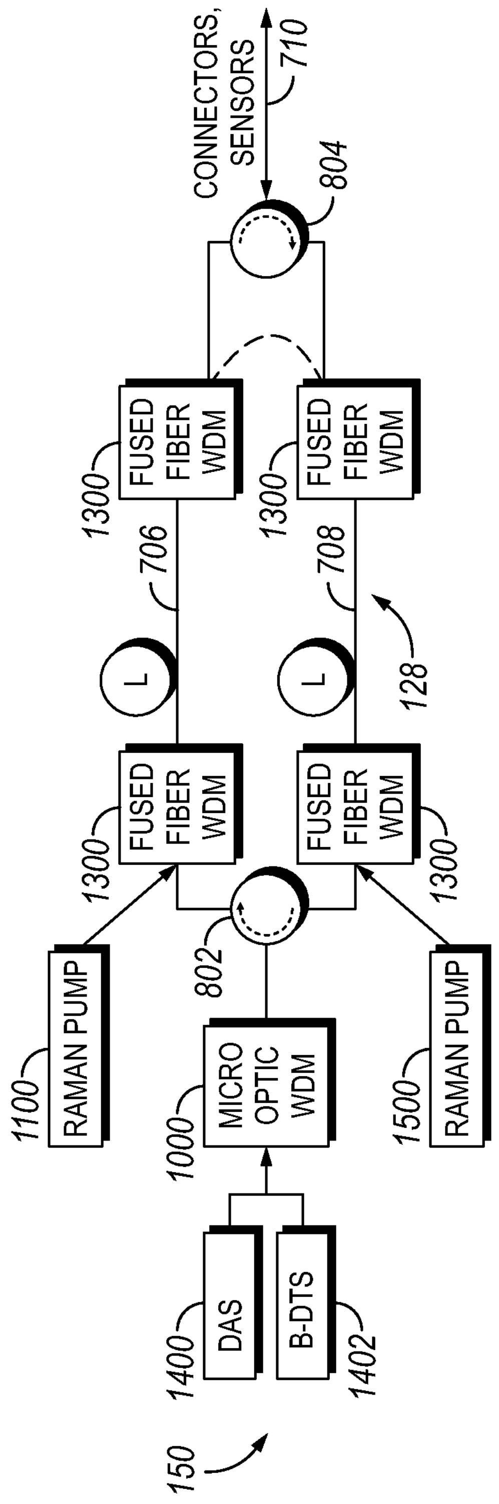
FIG. 15 illustrates another example in which a second set of Raman pumps on return fiber optic cable may be utilized.

FIG. 15 illustrates the example of FIG. 14 but further comprises a second Raman pump 1500 on return fiber 708, which may be utilized. The second Raman pump 1500 operates in a counter propagating mode, and the Distributed Raman Amplification (DRA) operates and functions as described above and below.

Figure 16:
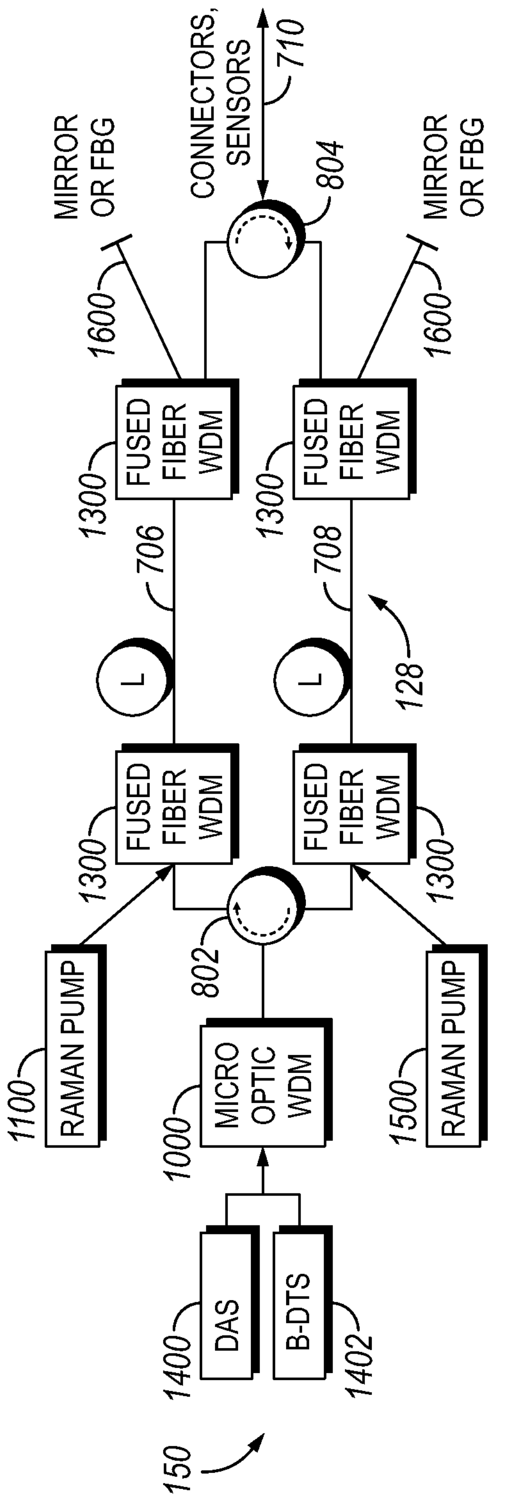
FIG. 16 illustrates an example to implement gain on both transmit fiber optic cable and return fiber optic cable.
Figure 17:
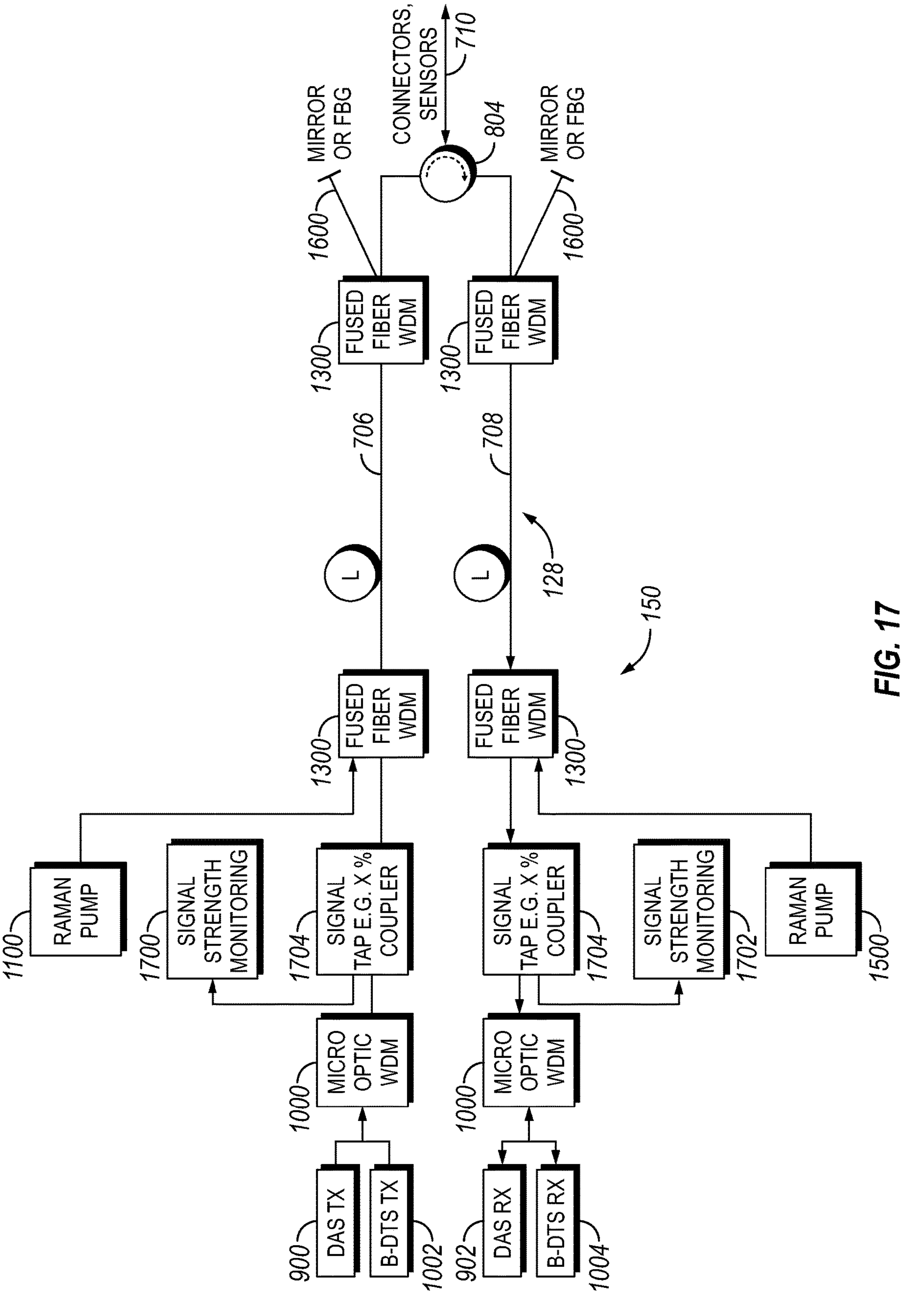
FIG. 17 illustrate an example that optimizes signal strength and gain levels throughout DAS system.

Further FIG. 16 illustrates the example of FIG. 15 but further comprises reflecting elements 1600. In this example, gain on transmission fiber 706 and return fiber 708 is created by reflecting the Raman power back into transmission fiber 706 or return fiber 708 using a suitable reflective element 1600. This may allow for independent control of the distributed Raman gain for transmission fiber 706 and return fiber 708, independently. As illustrated in FIGS. 16 and 17, reflective elements 1600 may be a part of or connected to fused fiber WDMs 1300. Fused fiber WDMs 1300 and reflective elements 1600 may allow recirculation of excess remaining pump light in reverse order through the same transmission fiber. In examples, reflective elements 1600 may be one or more mirrors and/or one or more Fiber Bragg Gratings (FBG). The mirror or FBG may be integrated into fused fiber WDM 1300 or connected externally to fused fiber WDM 1300 legs. Fused fiber WDM 1300 may prevent high power pump light from reaching distal circulator 804, which may prevent optical power damage to distal circulator 804 and/or subsea and wellhead connectors.

FIG. 17 illustrate an example that optimizes signal strength and gain levels throughout DAS system 150. As discussed above in FIGS. 9 and 10, fiber optic cable 128 is decoupled. Specifically, proximal circulator 802 is removed (e.g., referring to FIGS. 8 and 14-16). Additionally, all devices discussed in FIGS. 16 and 10 are utilized to function and operate as discussed above. Transmission fiber 706 fiber and return fiber 708 may be independently optimized. Optimizing may be performed to provide the best possible OSNR in DAS system 150. To perform this optimization in transmission fiber 706, signal strength monitoring module 1700 enables measurements of signal strength as a function of transmitted signal pulse power from transmitter 900 and/or Brillouin DTS transmitter 1002 and Raman pump power from Raman pump 1100 (i.e., distributed Raman Gain).

A signal strength monitoring module 1700 may function as an optical power meter of the backscattered light signals at the light frequencies utilized by DAS and DTS over distance. It may employ a number of opto-electronic components such as e.g., square-law photodetectors (to convert the back-scattered light into an electrical signal proportional to optical power), optical shutters (to restrict the measurement to certain portions of the transmission fiber e.g., close to WDM 1300), high speed digitizers (to sample the back-scattered light at a sufficiently high spatial sampling interval), etc.

For example, the signal strength monitoring module 1700 may be a photodiode or other similar opto-electric device where the optical energy may be converted to an electrical signal where the signal intensity, current or voltage is a measure of signal strength. Optional implementations comprise WDM's where individual optical wavelengths are separated in the optical domain and routed to individual wavelength dedicated opto-electric converters. Signal tap couplers 1704 may be used to enable signal strength monitoring of transmitted pulses from the sensing systems, back scattered light from transmission fiber 706 and return signals on return fiber 708. Signal strength monitoring modules may be calibrated over wavelength and/or optical power.

Raman pump 1100/1500 may use an internal photodiode for output power monitoring, and this internal photo diode signal strength may be calibrated with pump laser power in order to enable control of individual pump lasers. This enables operation of individual pump laser wavelengths and thus enables gain shape control of a multi-wavelength DRA system. Individual signal wavelength strengths may then be measured with a signal strength monitoring module 1700 and individual Raman pump laser powers may be adjusted for a controlled Raman gain shape and optimum system level signal to noise properties when combined with individual signal laser power controls. In one example, determining the power of a Raman pump module may be to use a drive current as a measure of output power where a calibration may be performed during manufacturing where laser output power is measured as a function of laser drive current. Additional probe lasers may be comprised in the signal strength monitoring modules 1700 where probe lasers may be used to setup gain profiles and gain levels at specific wavelengths. Probe lasers may be optically connected (i.e., using optical couplers or WDMs) in close proximity of the signal strength monitoring where the probe lasers are used transmit a probe signal into the fiber used for DRA. The probe lasers may be at a wavelength substantially similar to the signal laser wavelength(s) or may be located at pre-determined wavelengths in close proximity to the signal laser wavelengths.

Transmitted signal pulse power that is too high for DAS system 150 causes non-linear penalties, thus the signal pulse power may be lowered to stay just below non-linear penalty levels. Additionally, too much Raman gain may amplify the signal which may provide a high signal pulse power and associated nonlinear effects. Signal strength monitoring module 1700 may be able to measure the backscattered Rayleigh signal strength over distance and may allow for optimizing DAS system 150 by adjusting the transmitted signal pulse power from transmitter 900 and/or Brillouin DTS transmitter 1002 and the Raman pump 1100 power to have the highest possible signal pulse power to reach downhole sensing fiber 710. Thus, this optimization maximizes signal pulse power from transmitter 900 and/or Brillouin DTS transmitter 1002 at the distal end of transmission fiber 706.

To perform this optimization in return fiber 708, the optimization looks at the amplification of the backscattered signal returning back to receiver 902 and/or Brillouin DTS receiver 1004 by changing the Raman pump 1500 power to a maximum level in order to get the best possible OSNR for both the DAS and BDTS systems Optimizing signal strength and gain levels may be performed by implementing monitoring elements. For example, an upper signal strength monitoring module 1700 may be used to monitor signal levels on the transmitted pulses as well as back scattered Rayleigh light as the transmitted pulses travel down transmission fiber 706. Signal strength monitoring module 1700 may monitor signal levels by connecting to transmission fiber 706 through signal tap coupler 1704. Signal tap coupler 1704 may be a fused fiber device where a small portion of the optical signal is diverted from the main optical path. For example, 95-99% of the optical signal may pass from fused fiber WDM 1300 through signal tap coupler 1704 to micro-optic WDM 1000 and the remaining 1-5% may be diverted to signal strength monitoring modules 1700/1702. Reviewing the signal levels allow a user to determine if the path is optimized or may need to be adjusted, as discussed above. Signal tap coupler 1704 may be made with any pass thru/tap ratio, and the numbers above are general guidelines as other split rations and devices may be used to achieve similar functions.

The Raman pump power and individual pump laser powers may then be adjusted to keep the transmitted pulse power within an amplitude band such that the downward propagating signal is kept within limits to minimize non-linear signal degradation and optimize signal strength in downhole sensing fiber 710. Lower signal strength monitoring module 1702 may be used to monitor the return signal strength. As illustrated, lower signal strength monitoring module 1702 may connect to return fiber 708 through signal tap coupler 1704. Raman pump power may be adjusted to keep the back-scattered light within an amplitude band so that the return signal may be amplified for optimum signal strength while avoiding damage to optical components in the system. An optional signal source may be added into this block in order to provide a probe signal that may be pulsed on demand in order to measure the back scattered Rayleigh signal strength along fiber optic cable 128 in order to determine the Raman gain along fiber optic cable 128. This architecture may then be used to monitor signal strength levels across DAS system 150 in real-time. Additional signal processing may also be done on the detected signal and various quality metrics such that various power condition routines may be implemented, for example, periodically vary the transmitted signal strength and measure impact on signal quality or periodically vary the Raman pump power and measure impact on signal quality and/or the like.

Figure 18:
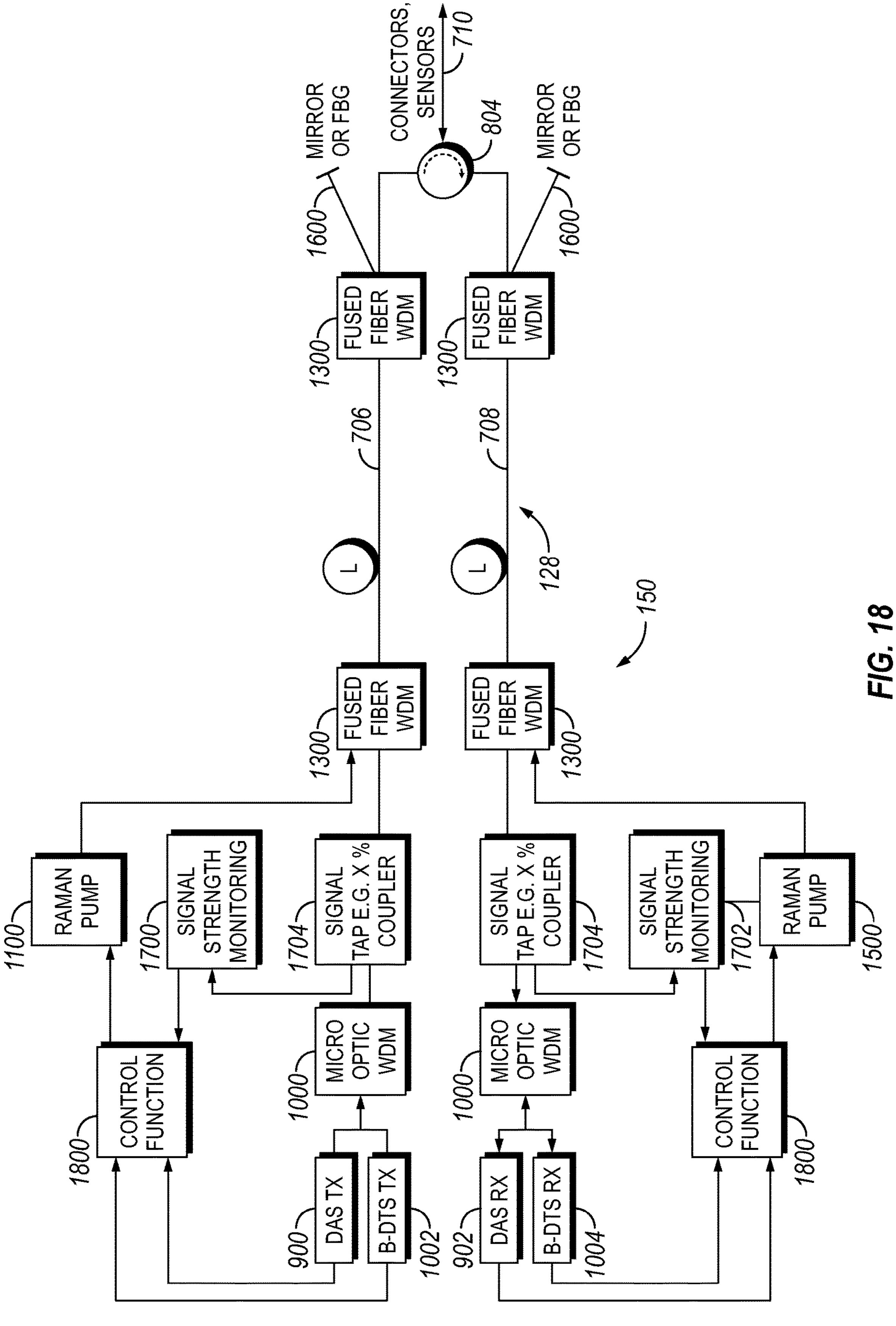
FIG. 18 illustrates a schematic of possible methods utilizing Control Functions.

FIG. 18 illustrates an example of DAS system 150 that comprises all devices of FIG. 17 and further comprises an information handling system 130 (e.g., referring to FIG. 1) that may implement a Control Function 1800. It should be noted that there may be multiple information handling systems 130 performing multiple Control Function 1800 or a single information handling system 130 performing Control Function 1800. Additionally, while two boxes are illustrated for Control Function 1800 in FIG. 18, and Figures below, there may be a single Control Function that operates on one or more information handling systems 130 to control DAS system 150. As illustrated, inputs to Control Function 1800 may come from Brillouin DTS transmitter 1002, transmitter 900, Brillouin DTS receiver 1004, receiver 902, and/or one or more signal strength monitoring modules 1700, 1702.

Figure 29:
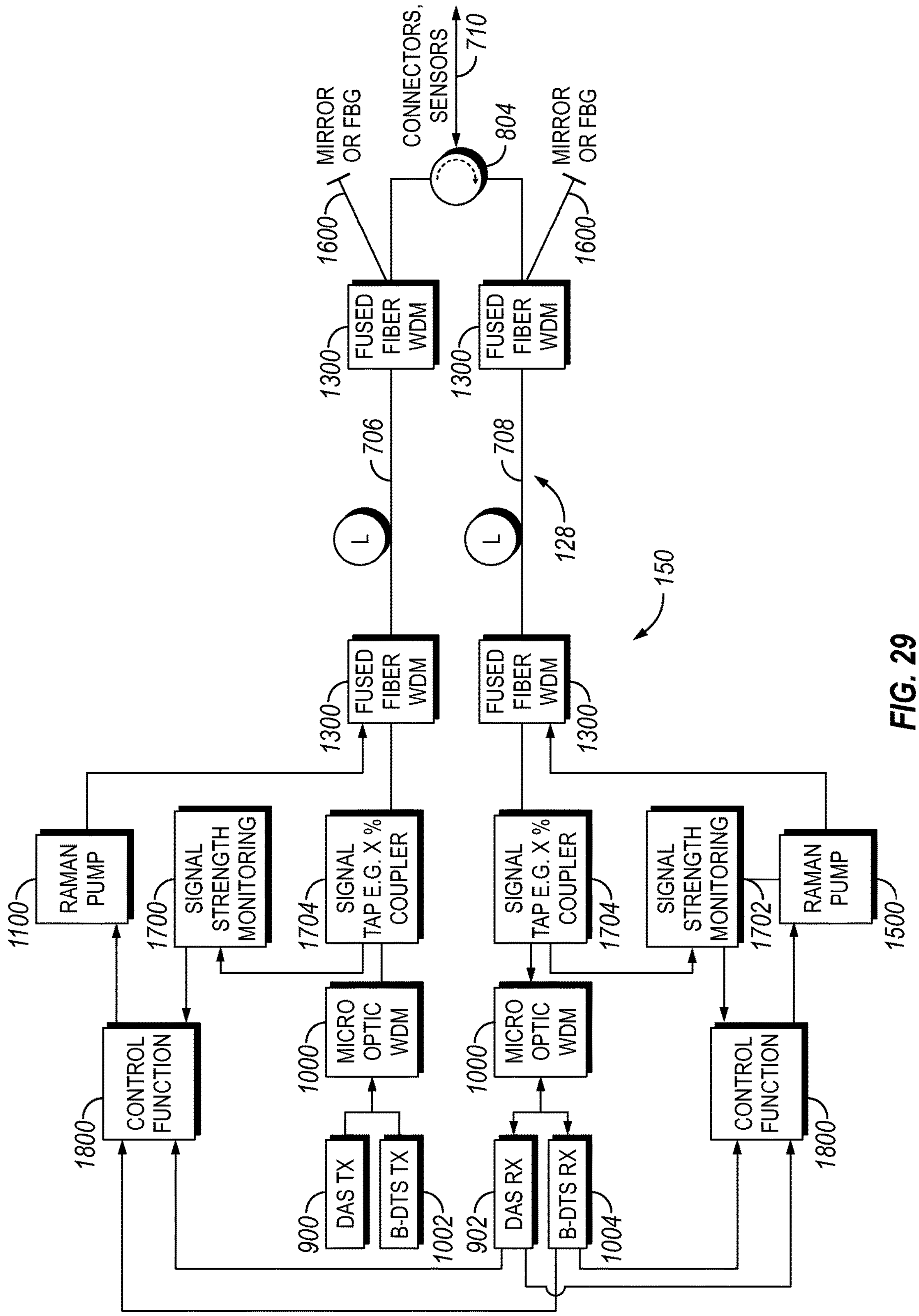
FIG. 29 illustrates another example of FIG. 18 utilizing one or more Control Functions.

Control Function 1800 operates and functions to provide feedback in a control loop to automatically adjust pump laser current based on a predetermined amplified signal return without under or over amplification. Raman pump power levels and transmitted sensing system pulse power may be controlled based on pre-determined limits and/or real-time feedback from calculated parameters such as system noise floor, optical signal to noise, signal distortion, non-linearity, and/or the like. This is effectively an Automatic Gain Control for stabilized return signal levels for optimized signal-to-noise ratio. FIG. 29 illustrates another example utilizing Control Functions 1800. DAS data (upper and lower) may be examined directly for (interferometric) self-noise at locations on interest. Both of these "noise" terms may be normalized to defined bandwidths and given respective weightings by algorithms implemented in Control Functions 1800. Another form of calibrating Raman Pumps may be to configure the Raman pumps such that the intensity of the DAS/DTS backscattered light returning from the distal end of downhole sensing fiber 710 is maximized. This data combined with the signal strength monitors may be processed in Control Functions 1800 to control the Raman pumps for system performance. Signal strength monitors may house optics like e.g., Wavelength Division Multiplexers (WDMs) where signals may be split into different wavelength bands thus enabling individual laser wavelength monitoring where each wavelength may be coupled to individual photo-detectors and associated analog-to-digital signal conversion and communication with Control Functions 1800. Pilot tones via AM (amplitude modulation) or Angle modulation (frequency or phase modulation) of the pump light may be injected to enable more precise Phase locked Loop (PLL) control of Raman gain.

Figure 19:
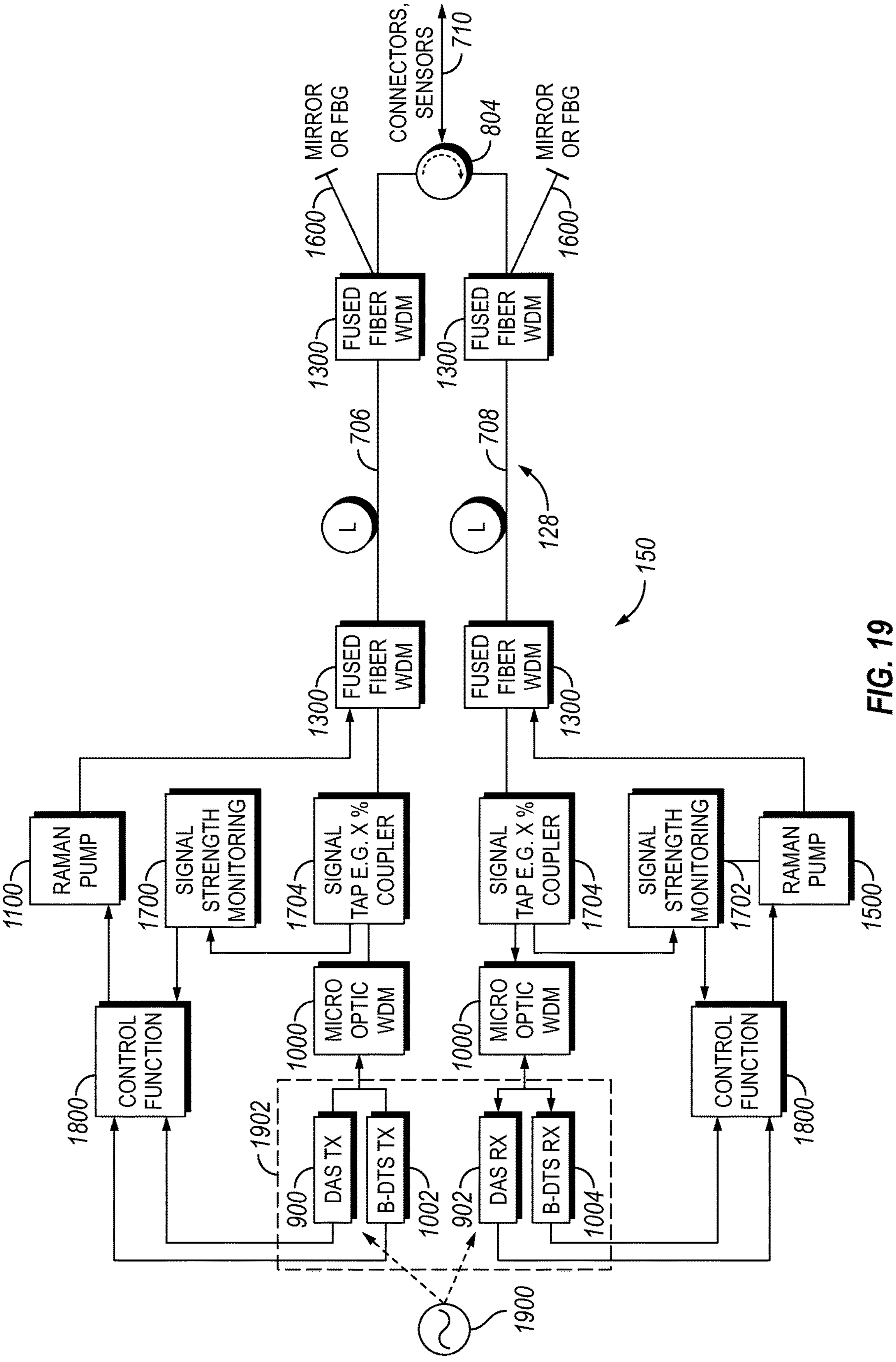
FIG. 19 illustrates an example in which active test signals from a signal generator may be applied to DAS Interrogators.

FIG. 19 is an example that utilizes all the devices from FIG. 18 and further comprises a signal generator 1900 that may operate and function to produce active test signals to be applied to DAS Interrogator 1902 for more comprehensive evaluation of signal quality metrics. For example, a signal generator 1900 producing a dynamic voltage signal to DAS interrogator 1902 and applying that signal to a calibrated optical phase modulator located in the optical chain responsible for recombination of the optical signals that comprise the interferometer. This may cause a high-quality phase modulation directly proportional to the voltage signal created by signal generator 1900. This phase modulation superimposes the DAS sensed signals at every location of fiber optical cable 128 (sensor and leads as applicable). The control function may process these superimposed DAS signals to assess the dynamic signal quality metrics related to frequency response (or frequency dependent scale factor), dynamic range, and linearity (distortion) at locations of interest. Other means of generating control signals and/or signal strength variation within DAS system 150 may comprise varying Raman pump power and/or interrogator and/or probe signal strength periodically or on demand in order to gain system level insights used for control and optimization. DAS system 150 signals and probe signals may operate at different wavelengths thus enabling characterization of wavelength dependent gain and optimization for each wavelength independently in a multi-wavelength system. The systems and methods described above may be applied to any of the Figures discussed above or below where sensing of signals and controls may be shown and/or described.

Figure 20:
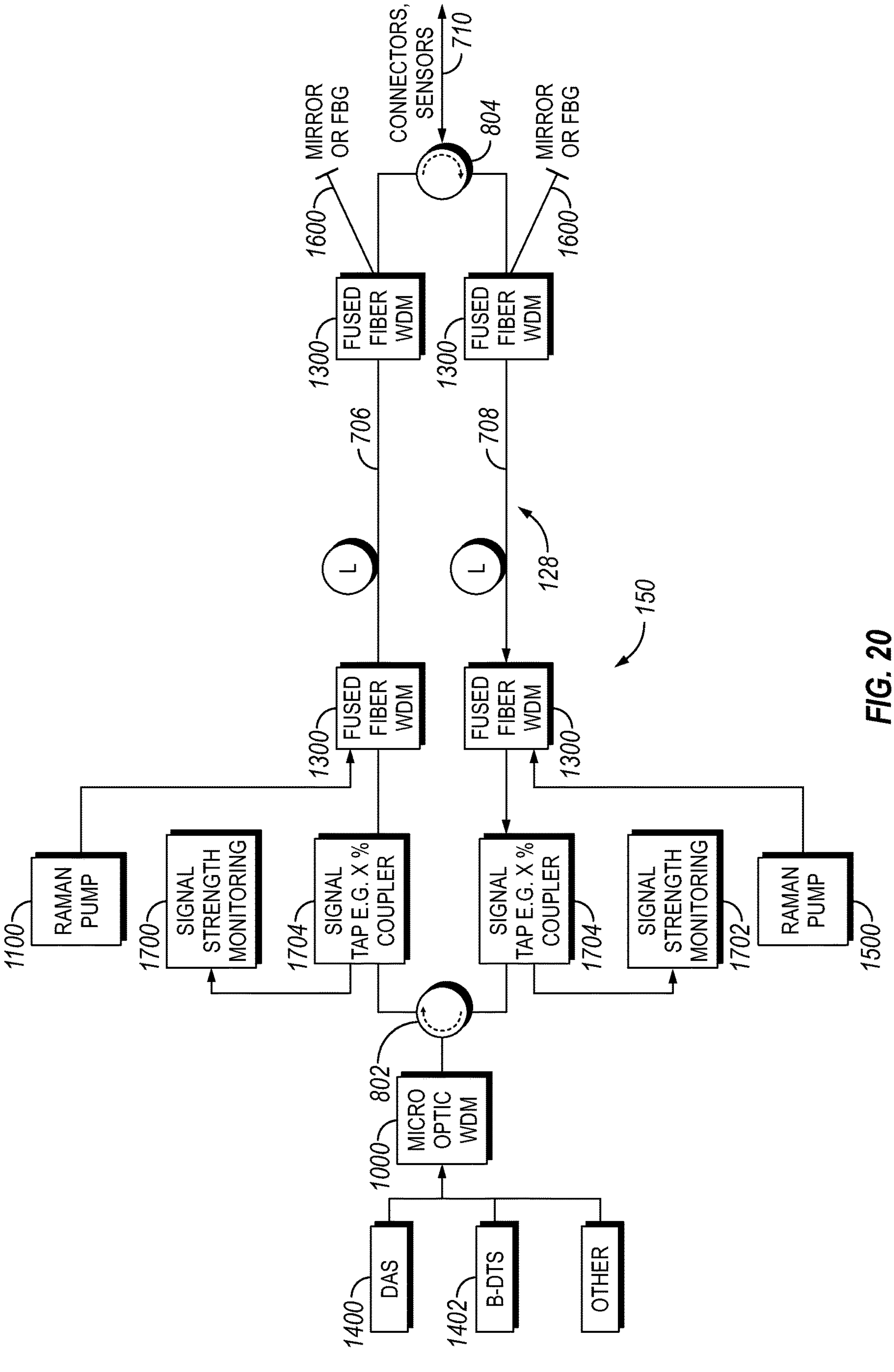
FIG. 20 illustrates a DAS system configuration that combines properties from FIG. 14-19.

Additionally, FIG. 20 illustrates an example that comprises the devices and scope of each FIG. 14-16 described above where fiber optic cable 128 is coupled using proximal circulator 802. As illustrated, proximal circulator 802 may connect fiber optic cable 128 to micro-optic WDM 1000, which may operate and function as described above. In other examples to extend fiber optic cable 128 effective range may be utilizing any fiber optic-based sensor. For example, Fiber Bragg Grating (FBG) based sensors that may be multiplexed using wavelength division multiplexing or time division multiplexing, Fabry-Perot point or multi-point sensors and other sensing principles.

These sensors may affect the distributed gain with Raman amplification by propagating high optical power in the same fiber optic cable 128 as the signals selected for amplification. The Raman amplification happens over a 10's of km's of fiber length and the Raman pump wavelength may be spaced apart from the signal wavelength in the wavelength domain. The Raman gain peak is about 13 THz away from the pump laser at 1450 nm, which equals to around 100 nm to provide peak gain at around 1550 nm. Raman gain is polarization dependent, and may de-polarize the Raman pump sources to avoid polarization dependent signal gain. Depolarization may be done by Lyot de-polarizers or may also provide similar pump power at orthogonal pump polarization states using a polarization multiplexer or a polarization beam combiner.

Figure 21:
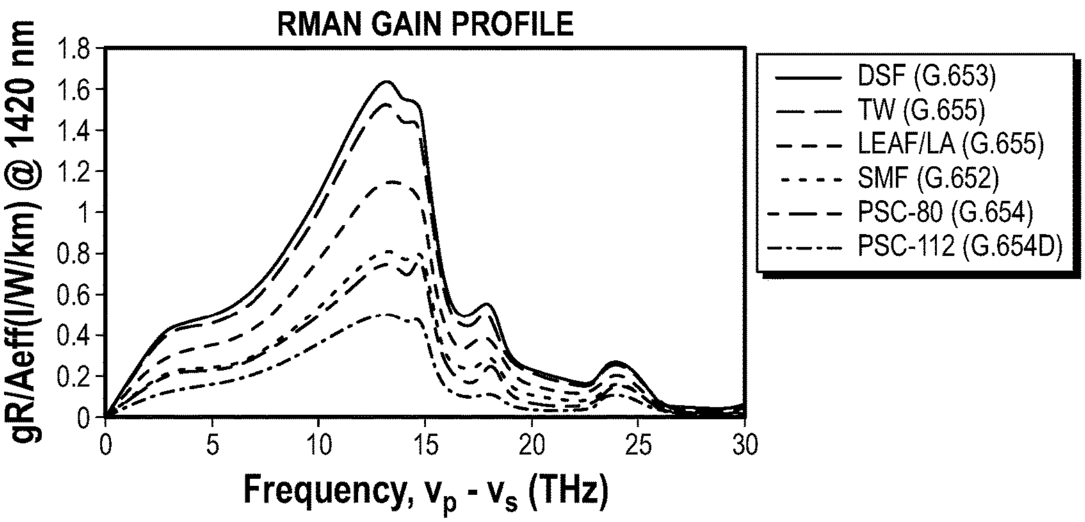
FIG. 21 illustrates a graph of a Raman gain shape that may be fairly wide and dependent on fiber optic cable.

FIG. 21 illustrates a graph of a Raman gain shape that may be fairly wide and dependent on fiber optic cable 128 (e.g., referring to FIG. 19), or more precisely the glass chemistry in the core of the optical fiber in transmission fiber 706 and return fiber 708 (e.g., referring to FIG. 19). The peak gain in the graph of FIG. 21 is located at about 13 THz, which at these wavelengths translates to about 100 nm wavelength shift. For example, a Raman pump 1100,1500 (e.g., referring to FIG. 19) at 1450 nm may provide gain at around 1550 nm over a length of fiber optic cable 128. In another example, the Raman pump wavelengths may be spaced across a wavelength range in order to support signal gain at various distances. This may be done by having a Raman pump 1100, 1500 placed at 1350 nm in order to provide gain to a Raman pump source placed at 1450 nm such that the 1450 nm source may provide gain to a 1550 nm signal while the 1450 nm pump source is being replenished by the 1350 nm Raman pump. The actual pump wavelengths may deviate from the example above as the example show 100 nm separation which may not be the most power efficient implementation. Different pump power at different wavelengths may also be used to control the Raman gain shape to compensate for system dependent signal losses.

Figure 22A:
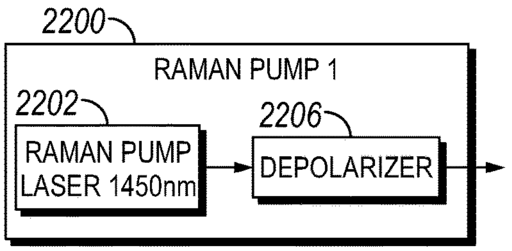
FIG. 22A-22C illustrate different forms of Raman Pumps.
Figure 22B:
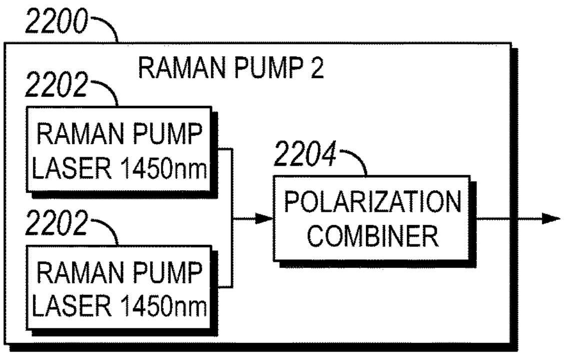
Figure 22C:
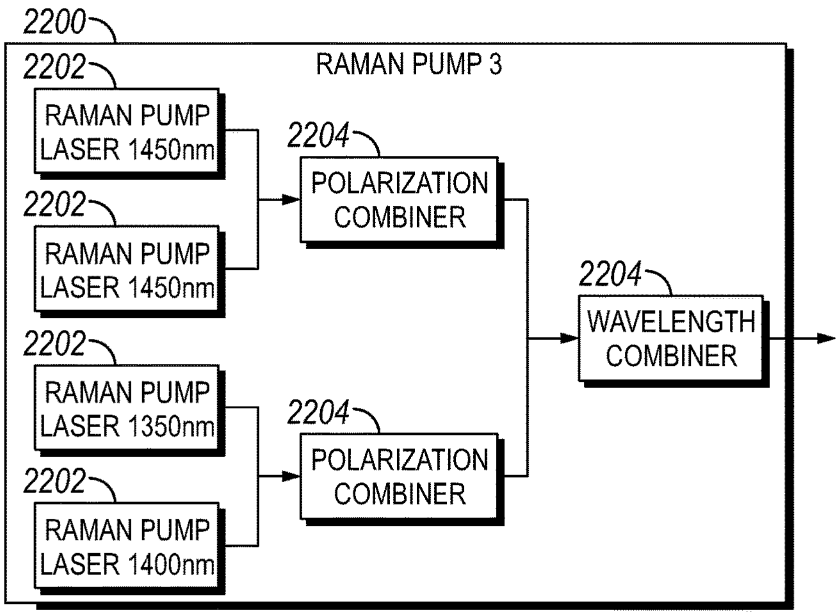

FIGS. 22A, 22B, and 22C illustrates Raman Pump module 2200. It is understood that the Raman pump module 2200 may have one or more pump lasers 2202 at similar or different wavelengths where pump lasers 2202 may be combined with a polarization combiner 2204. A polarization combiner 2204 may comprise wavelength multiplexers, wavelength combiners and/or polarization beam combiners. Raman pump module 2200 may comprise de-polarizers 2206 or means to combine pump laser power from multiple pump lasers and/or control individual pump laser powers with the objective of controlling/minimizing polarization dependent gain due to Raman amplification contribution from individual pump lasers while meeting overall gain targets for the selected span. Each individual pump laser 2202 may be wavelength locked using one or more Fiber Bragg Gratings (FBGs) to ensure stable wavelength during operation across a large operating envelope where the output fiber from the laser may be a Polarization Maintaining (PM) fiber. Pump lasers 2202 may house an internal Photo Diode (PD) and/or a thermistor for monitoring operation and feedback control, and the pump laser assembly may comprise a Thermo-Electric Cooler (TEC) for temperature control. Individual pump lasers 2002 within a Raman pump module 2200 may be controlled independently for safe operation and in order to provide expected signal gain as a Raman pump module 2200 for a given signal wavelength, and multiple pump lasers 2202 within a Raman pump module 2200 may be varied to minimize polarization dependent gain variation while meeting expected signal gain needs. Gain variations across wavelength and amplitude of individual signal wavelengths within DAS system 150 may be monitored and optimized by varying pump laser settings within a Raman pump module 2200.

Figure 23:
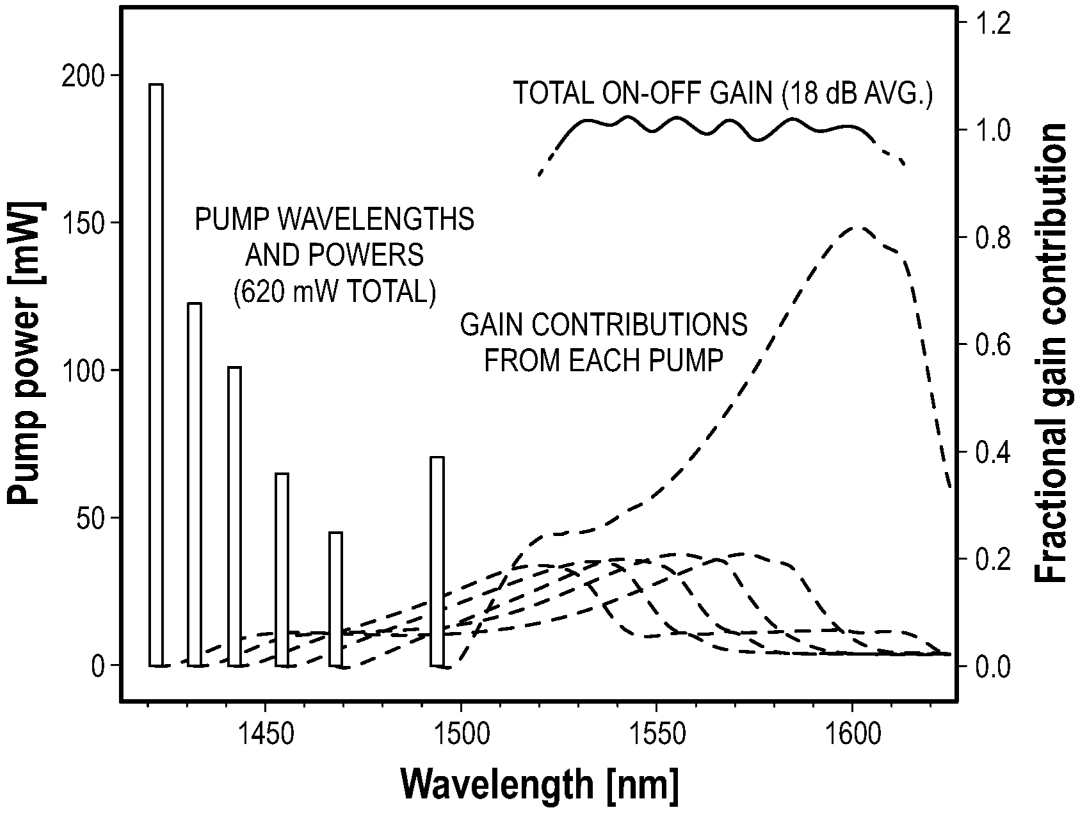
FIG. 23 illustrates an example with six pump wavelengths targeting a flat signal gain in a window up to 1600 nm.

FIG. 23 illustrates an example with six pump wavelengths targeting a somewhat flat signal gain in a window in the 1550 nm to 1600 nm region. The gain contribution from each laser adds to provide a total on-off gain, and any signals in the Raman gain window may be amplified so even pump lasers at different wavelengths gets amplified. The different pump wavelength selection and power would be tailored to provide a gain and gain shape at target wavelengths based on the selected sensor systems and system architecture. Referring back to FIGS. 22, in examples, pump lasers 2202 may be utilized in various combinations to achieve the gain over a selected signal fiber span length. Longer fiber lengths would benefit from using more pump laser wavelengths spaced further apart to allow for a suitable Raman optical fiber interaction length to provide signal gain further along the fiber. Raman gain occurs over fiber interaction lengths where the fiber lengths normally range from a few km's to more commonly 10's of km. Pump powers may be ranging from a few 10's of mW (milliwatts) to several 100's of mW per wavelength with a total combined optical power of up to 600-1200 mW for single mode Raman Pump modules. The pump power may be significantly more in selected cases where large core fibers may be used.

Figure 24:
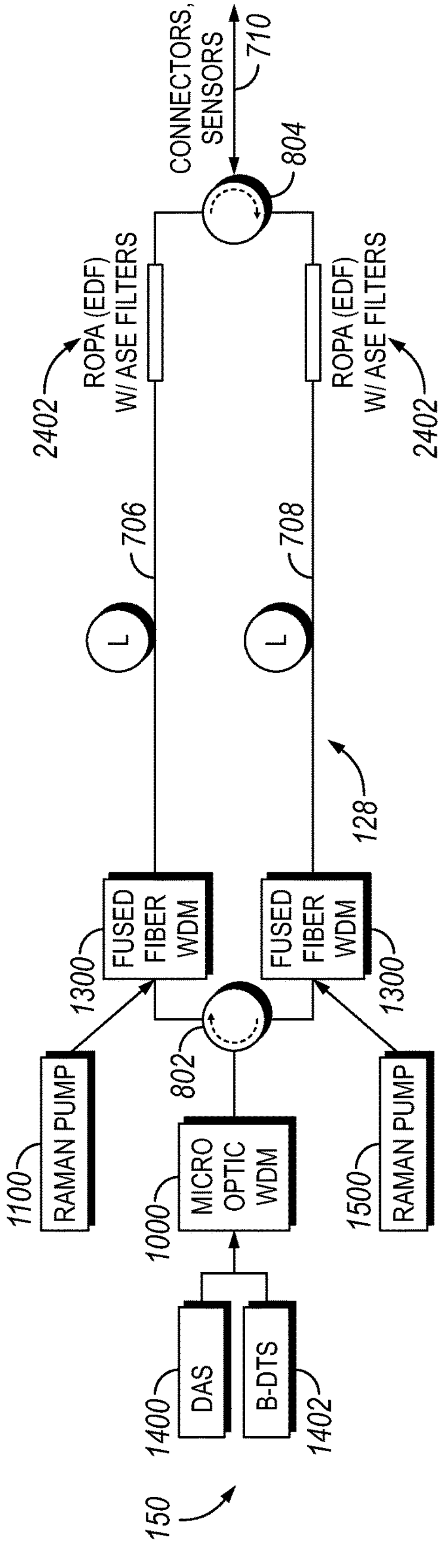
FIG. 24 illustrates examples in which circulators and connectors add point losses.

FIG. 24 comprises all devices from DAS system 150 in FIG. 20. FIG. 24 illustrates examples in which distal circulator 804 and connectors add point losses. In examples, point losses may be overcome by including deployment of one or more Remote Optically Pumped Amplifiers (ROPA) 2402 disposed on transmission fiber 706 and/or return fiber 708. In examples, ROPAs 2402 may further comprise of Erbium Doped Fiber Amplifiers (EDFAs). This solution requires electrical power and, thus, may need electrical cables and infrastructure which may be prohibitive in terms of cost and complexity. To overcome this issue passive Erbium Doped Fibers (EDFs) may be used that may be remotely pumped with a 1480 nm Raman pump light or other suitable wavelength based on the selected EDF without the need for electrical power. Gain realized from ROPA 2402 may be dependent on the pump power, pump wavelength and the EDF characteristics as well as the total length of a selected EDF. ROPA's 2402 may reduce system cost and complexity while providing remote point gain. Additionally, ROPA's 2402 and other components such as fused fiber WDM's 1300 (e.g., referring to FIGS. 13-20) and circulators may be housed in flying leads or other subsea components that may be replaced using Remotely Operated Vehicles (ROVs) in case additional gain is utilized. Components and sub-systems may be housed in connectorized assemblies enabling replacement and/or system upgrades using e.g., ROV's.

Figure 25:
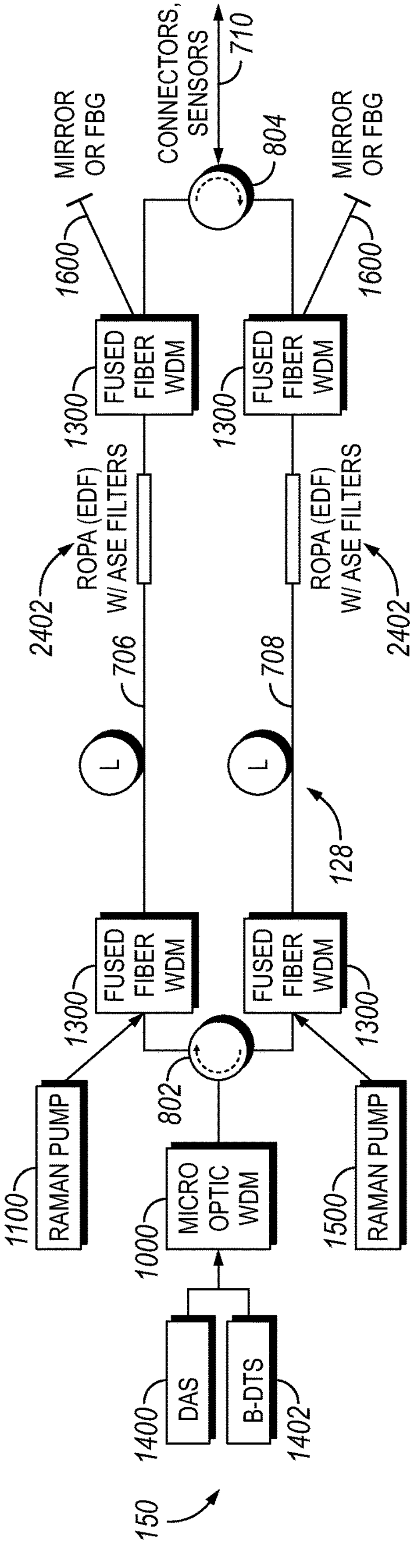
FIG. 25 illustrates an example that may balance the distributed Raman gain.

FIG. 25 illustrates an example that utilizes all devices disclosed in FIG. 24 and may further comprise reflective elements 1600. DAS system 150 illustrated in FIG. 25 may balance the distributed Raman gain and the gain from ROPA 2402. This may be performed by designing DAS system 150 to always have a fixed amount of gain from the EDF regardless of Raman pump power such that the ROPA gain may be used to overcome connector and component losses and the Raman gain may be used to for system level gain control.

These methods may be achieved by characterizing the EDF saturation properties where the gain and pump power absorption is measured. A fully pump saturated EDF may produce a fixed amount of gain per unit length while allowing the excess pump power to pass through. The gain from a length of fiber will then be constant across a range of pump power while allowing the remnant optical pump power to pass through. The architecture above, with a carefully selected length of EDF, would thus satisfy a fixed gain need across a variety of Raman pump powers once a certain Raman pump power threshold has been reached. The Raman pump power may then be used to control the transmission fiber gain while having a constant step gain similar to the expected component and connector attenuation around the well head.

It may be necessary to limit the optical power reaching free-space optical components, reflective elements 1600, with lens arrangements and optical connectors in order to reduce the risk of thermal damage. This may be performed by using the fused fiber WDM 1300 to filter out and reflect Raman pump power and other filters and/or WDMs may be used to filter out excess optical power close to the signal bands. Various notch filters and/or Amplified Spontaneous Emission (ASE) filters may be added as needed.

Figure 30:
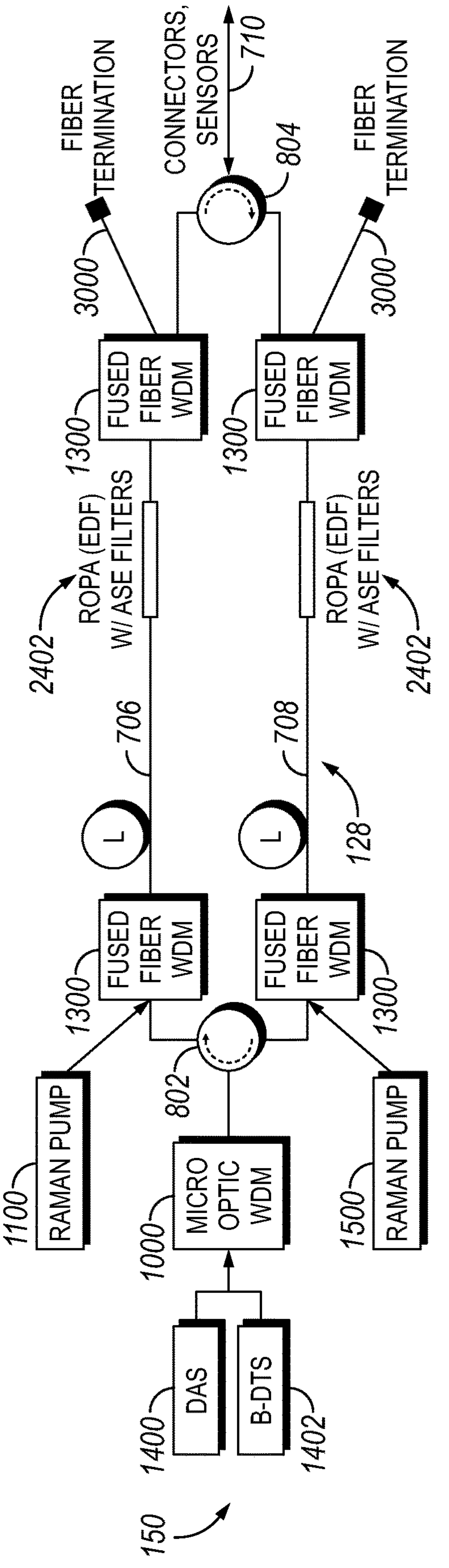
FIG. 30 illustrates another example of FIGS. 16-18, 19, 20 and 25 where one or more reflective elements are replaced with one or more dissipative element.

FIG. 30 illustrates another example of FIG. 25, including all devices discussed in FIG. 25. As illustrated, reflective elements 1600 may be replaced by dissipative elements 3000 and connected to fused fiber WDM 1300. In this example, dissipative element 3000 dissipates any excess optical power occurring at frequencies outside the signal bands used by DAS, DTS, DSS and the like, without reflecting any of the excess optical power back into transmission fiber 706 or return fiber 708. Dissipative element 3000 may comprise of coreless termination fiber, fiber end caps or any other optical element or combinations of elements that may operate to dissipate light without introducing strong back-reflections at a fiber-air interface. Note that reflective element 1600 may also be replaced with dissipative element 3000 in FIGS. 16 to 20 and 25 without departing from the scope of the present disclosure.

Large mode field or Large Effective Area fibers (LEAFs) have been developed for long haul repeaterless subsea transmission to minimize the need for active amplifier stations along the seafloor and to eliminate or to minimize non-linear multiwavelength optical signal interaction (cross-talk) effects along the fiber length. LEAF fibers effectively allow high power optical transmission due primarily to reduced optical power density across the mode field diameter within the fiber optic waveguide core guidance region. Aforementioned non-linear effects may comprise Stimulated Raman Scattering (SRS), Stimulated Brillouin Scattering (SBS), Self-Phase Modulation (SPM), Cross-Phase Modulation (XPM), and/or Four-Wave Mixing (FWM). As such, reduced power density effectively also allows an increased optical transmission power from pump lasers without approaching power damage threshold at glass fiber end faces and/or micro-optic elements. A person skilled in the art recognizes that the fiber in the umbilical and flowline may have different properties than the downhole sensing fiber.

Amplification methods of DAS system 150 may be utilized to increase the length of fiber optic cables 128. Remote signal amplification in the 1550 nm band may be realized using various methods. As previously pointed out, Raman laser pump light, typically at shorter wavelengths (higher photon energies) or perhaps near 1450 nm, may be transmitted along the primary transmission fiber where, via non-linear Raman scattering, energy from the shorter pump wavelengths is coupled into the longer 1550 nm band signal wavelengths to produce effective gain.

Laser pump light may be made to propagate in the same direction as the outgoing 1550 nm probe signal (co-propagation) or it may propagate in the opposite direction to the 1550 nm probe signal (counter-propagation). In many instances, counter-propagation may exhibit higher energy transfer efficiency.

Figure 26:
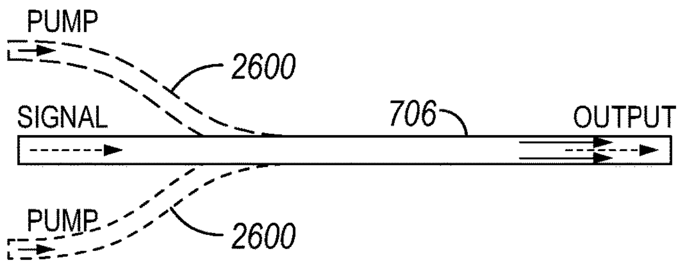
FIG. 26 illustrates an example in which multiple short-wave Raman pump lasers may be combined onto the common single mode transmission.

Optical pump power transmission via ancillary multimode fibers of DAS system 150 may be utilized to increase the length of fiber optic cables 128. Optical pump power may be separately transmitted via multimode transmission fibers 706 to remote EDF amplifier nodes where tap WDM couplers may be fed to the local EDF modules for localized pumping and amplification. Multiple pump lasers may be located at the surface and their powers combined via special Pump Signal Combiners to effectively sum multiple pump diode laser source powers onto a common large core multimode transmission fiber for pump light distribution along the signal path for periodic tapping where needed. Alternatively, FIG. 26 illustrates an example in which multiple shortwave Raman pump lasers 2600 may be combined onto the common single mode transmission fiber 706 to provide a continuum of Raman gain along said single mode transmission fiber 706, as described above.

Figure 27:
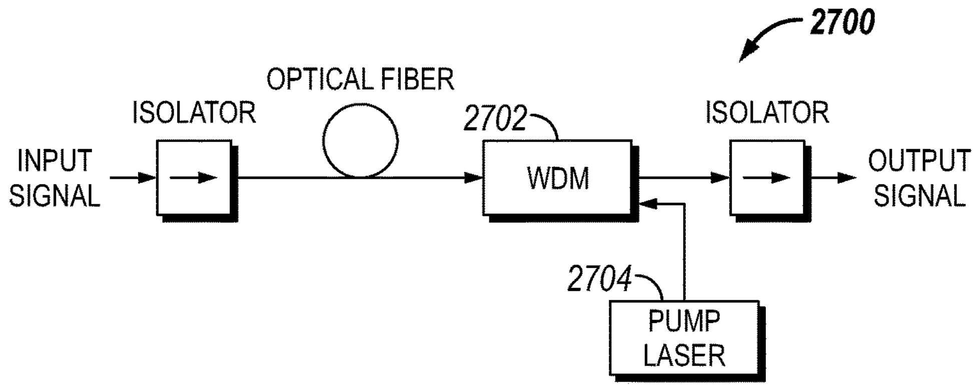
FIG. 27 illustrates a schematic of a single pump diode counter-pumped transmission fiber.
Figure 28A:
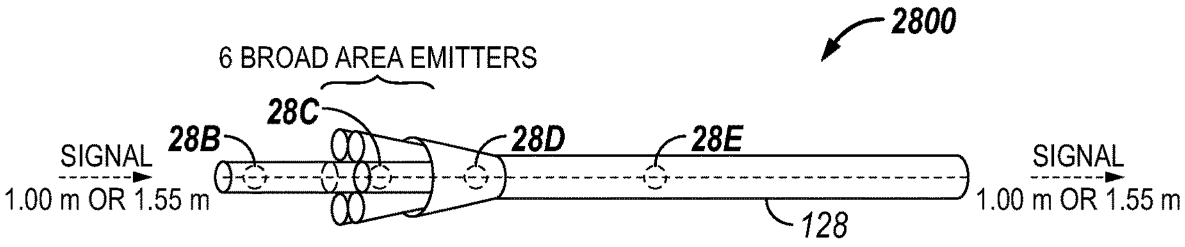
FIGS. 28A-28E illustrate cladding pumped fiber amplifiers.
Figures 28B, 28C, 28D, 28E:
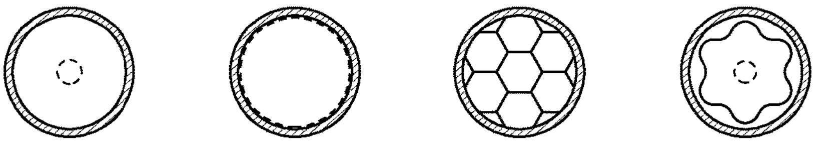

FIG. 27 illustrates a schematic of a single pump diode counter-pumped transmission fiber 2700. In examples, single pump diode counter-pumped transmission fiber 2700 may allow for reverse pumping based signal amplification whereby the signal direction and pump directions are opposite and optical isolators and remote WDMs 2702 may prevent pump light from reaching the signal transmitter. In this example, pump laser 2704 may be located at the surface instrument where a second LEAF single mode fiber or multimode fiber conveys pump light from the pump laser to the remote (WDM) 2702. In this case both transmission and pump fibers are separate. In examples, the pump light fibers do not have to run in parallel to the transmission fibers and do not need to be colocated with the surface instrument, but may be located elsewhere.

FIGS. 28A-28E illustrates cladding pumped fiber amplifiers 2800 that may be coupled and combine multiple shortwave Raman pump lasers onto a common LEAF single mode transmission fiber to generate gain along the length of fiber optic cable 128. FIGS. 28B-28E are different cross sections of fiber optic cable 128.

Figure 31:
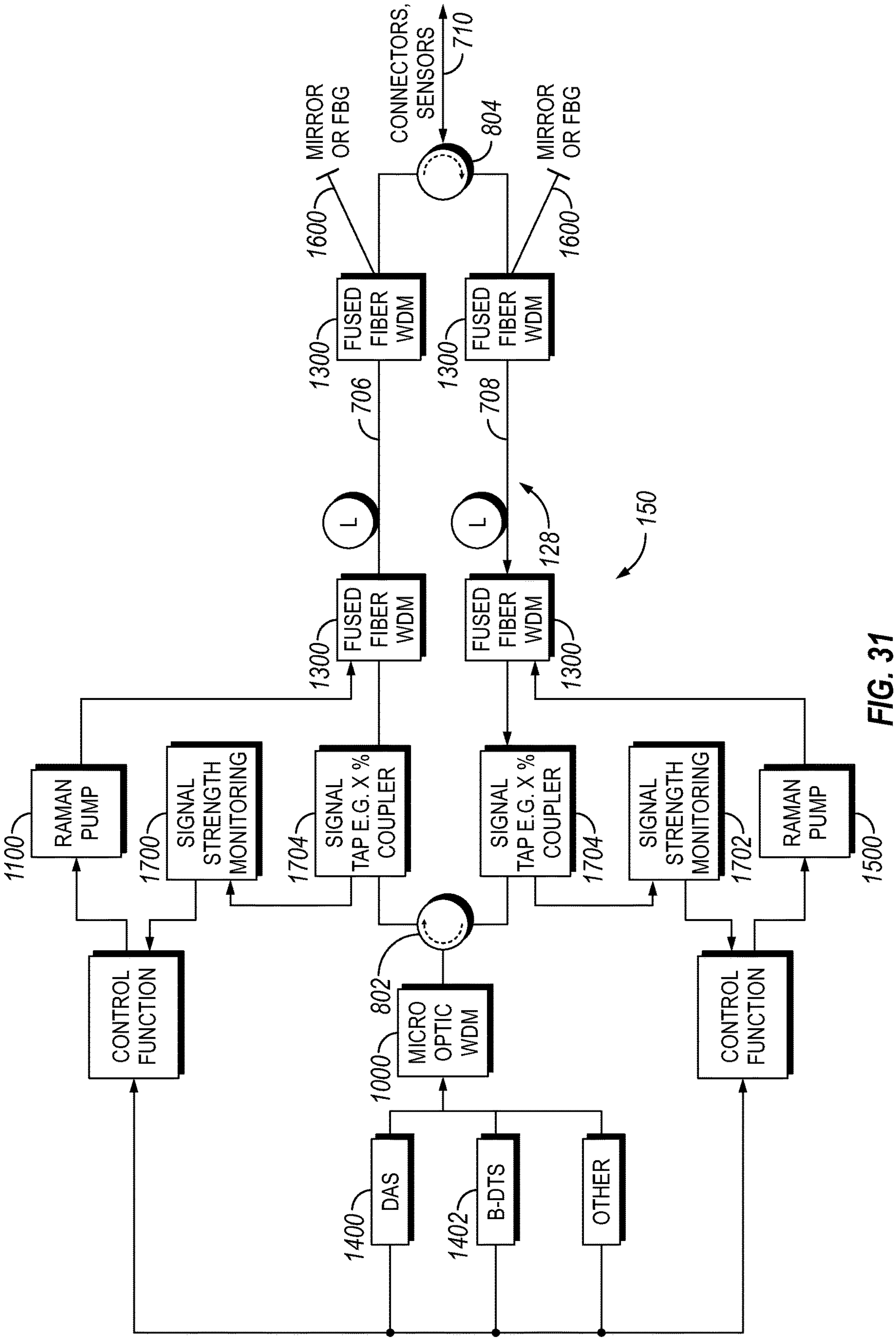
FIG. 31 illustrates another example of FIGS. 16-18, 19, 20 and 25 utilizing a one or more Control Functions.

Additionally, FIG. 31 illustrates another example of FIG. 20, which comprises the devices and scope of FIGS. 14-16 described above where fiber optic cable 128 is coupled using proximal circulator 802. As illustrated, proximal circulator 802 may connect fiber optic cable 128 to micro-optic WDM 1000, which may operate and function as described above. In other examples to extend fiber optic cable 128 effective range may be utilizing any fiber optic-based sensor. For example, Fiber Bragg Grating (FBG) based sensors that may be multiplexed using wavelength division multiplexing or time division multiplexing, Fabry-Perot point or multi-point sensors and other sensing principles.

Further illustrated in FIG. 31 are one or more utilizing Control Functions 1800. DAS data (upper and lower) may be examined directly for (interferometric) self-noise at locations of interest. Both of these "noise" terms may be normalized to defined bandwidths and given respective weightings by algorithms implemented in Control Functions 1800. Another form of calibrating Raman Pumps may be to configure the Raman pumps such that the intensity of the DAS/DTS backscattered light returning from the distal end of downhole sensing fiber 710 is maximized. This data combined with the signal strength monitors may be processed in Control Functions 1800 to control the Raman pumps and transmitted signal pulse power for optimal system performance. Signal strength monitors may house optics like e.g., Wavelength Division Multiplexers (WDMs) where signals may be split into different wavelength bands thus enabling individual laser wavelength monitoring where each wavelength may be coupled to individual photo-detectors and associated analog-to-digital signal conversion and communication with Control Functions 1800. Pilot tones via AM (amplitude modulation) or Angle modulation (frequency or phase modulation) of the pump light may be injected to enable more precise Phase locked Loop (PLL) control of Raman gain.

As shown and discussed above, light pulses may traverse a number of transmission fibers and connectors before reaching wellhead installation 112 and downhole sensing fiber 710 (e.g., referring to FIGS. 1 and 7, respectfully). FIG. 19 illustrates an example of a single extended reach span optical schematic without optical connectors and control function 1800, which may allow for signal and gain tuning in order to optimize Signal to Noise Ratio (SNR). In another example, FIG. 20 illustrates DAS system 150 without control functions 1800.

FIGS. 19 & 20 merely illustrate a general example of all the Figures and examples of DAS system 150 discussed above. However, for every example, it may be beneficial to have the highest possible SNR in extended reach and subsea applications. Loss may be found in DAS system 150 at any connection or splice where two or more fiber optic cables 128 meet.

Fiber optic cables 128, connectors, and signal routing components all have optical attenuation. Fiber optic interrogators used for fiber optic sensing and reservoir monitoring have an optical dynamic range, or Optical Signal to Noise Ratio (OSNR), defined by the maximum signal power that may be launched into a sensing system (transmission fiber, sensing fiber, sensors) and the noise floor of the sensing system.

The maximum signal power that may be launched into fiber optic cables 128 may be limited by the optical source, and this can sometimes be overcome by using optical amplifiers like Erbium Doped Fiber Amplifiers (EDFAs), where the signal amplitude is increased. EDFAs are opto-electric devices with power supplies, electronics and specialty optics packaged into bench-top enclosures, or rack mount enclosures or miniaturized so that they can be comprised in as sub-components of other electrical systems.

Other limitations of the maximum signal power may comprise thermal damage to connectors or other optical components commonly used in routing optical signals. Free-space optics and lenses are used to build micro-optic components such as, but not limited to, optical isolators, Wavelength Division Multiplexers (WDMs) 1300, filters, circulators 802, 804, and/or the like used to route signals in a directional fashion (e.g., referring to FIG. 1). Any point in DAS system 150 where the optical signal exits/enters a fiber optic cable 128 may be a point of concern where thermal damage due to high optical power levels may occur.

Yet other limitations comprise non-linear fiber transmission penalties like Stimulated Brillouin Scattering (SBS), Stimulated Raman Scattering (SRS), Kerr-effect related phenomena like Self-Phase Modulation (SPM), Cross-Phase Modulation (XPM), modulation instability, soliton formation or Four Wave Mixing (FWM). The non-linear effects are influenced by a number of parameters such as fiber dispersion, fiber effective area, channel spacing in WDM systems, signal intensity and source line width.

The noise floor and system SNR may in many instances be limited by interrogator system design, photo detector noise, optical component losses, and/or the like. The use of EDFAs may also be considered and optimized as both signal and noise may be amplified, and small signal gain is typically higher than large signal gain. Optical component losses prior to the gain element in the EDFA may also decrease the signal to noise. EDFA's are characterized by Noise Figure (NF) which is a measure of the degradation of the SNR. For example, if the signal is amplified the noise may be amplified even more and the losses prior to the gain element may reduce the signal amplitude so the actual SNR may be reduced.

Other challenges with pulsed sensing systems like Distributed Temperature Sensing (DTS), Distributed Acoustic Sensing (DAS), and Distributed Strain Sensing (DSS) systems where back scattered light is measured is the fact that only one signal may propagate through the sensing region of sensing fiber 710 at any given time in order to enable location determination using time of flight. This limits the pulse repetition rate in optical systems, which in turn limits the frequency content of signals as well as the amount of averaging of signals that may be done for any given time period.

Figure 32:
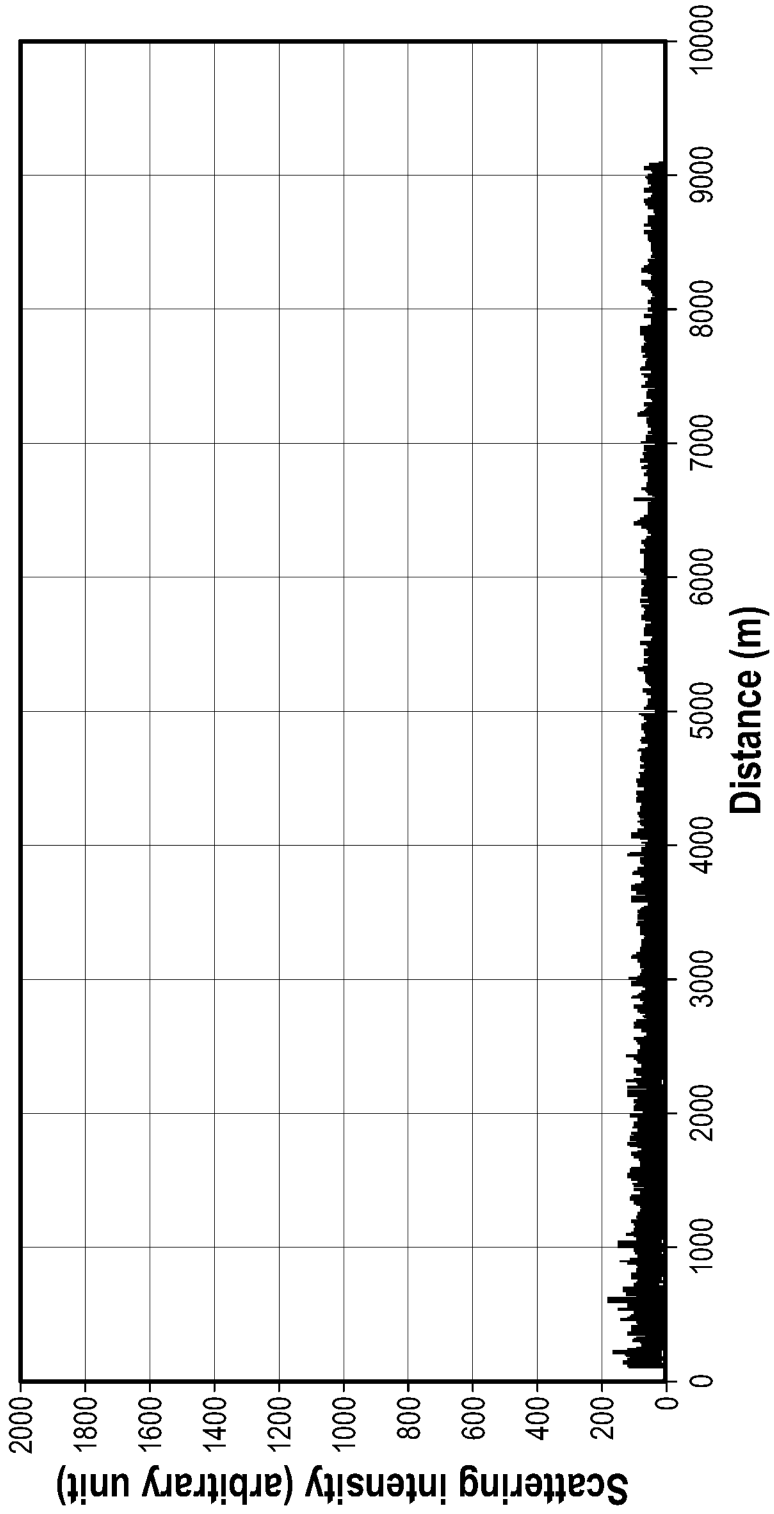
FIG. 32 is a graph of backscattered intensity that starts low and diminishes across the length of the fiber optic cable.

Generally, during measurement operations, a fiber optic cable 128 may produce a back scatter profile that is shown in FIG. 32 in a graphical form. The graph in FIG. 32 shows that the fiber back scatter profile has an optical SNR that is low. Optical SNR is directly proportional to the intensity of the fiber backscattered signal. In order to achieve the maximum optical SNR, the backscattered intensity should be maximized. The current standard is to use regular fiber back scatter profile optical fiber with a back scatter intensity profile as seen in the graph of FIG. 32. There are two challenges with this. The first is that the overall backscattered intensity level is low, and the other is that the intensity level gets even lower along the length of the fiber due to attenuation.

The level of back scattered intensity is determined by two main factors. The factors are the optical power of the input pulse light and the scattering coefficient of the fiber. Therefore, optical SNR may be increased by increasing the input optical pulse power and/or by increasing the scattering coefficient of the fiber. The maximum input optical peak power is limited by non-linear threshold of the fiber.

In current technology, increasing the input optical pulse power has been explored by way of employing negative dispersion fiber, which has higher non-linear threshold than regular fiber. Additionally, a negative dispersion fiber has been experimentally shown to yield several dB improvements in optical SNR over regular fiber. However, negative dispersion fiber suffers from higher attenuation which causes the optical SNR to decrease faster along the fiber length and detrimental to SNR longer spans of sensing fiber. Additionally, in the case of subsea systems where a long span of transmission fiber is deployed to transport the input optical pulse to the sensing fiber, the maximum pulse power is effectively limited lower by the non-linear threshold of the transmission fiber, and it negates the benefit of the negative dispersion of the sensing fiber.

Figure 33:
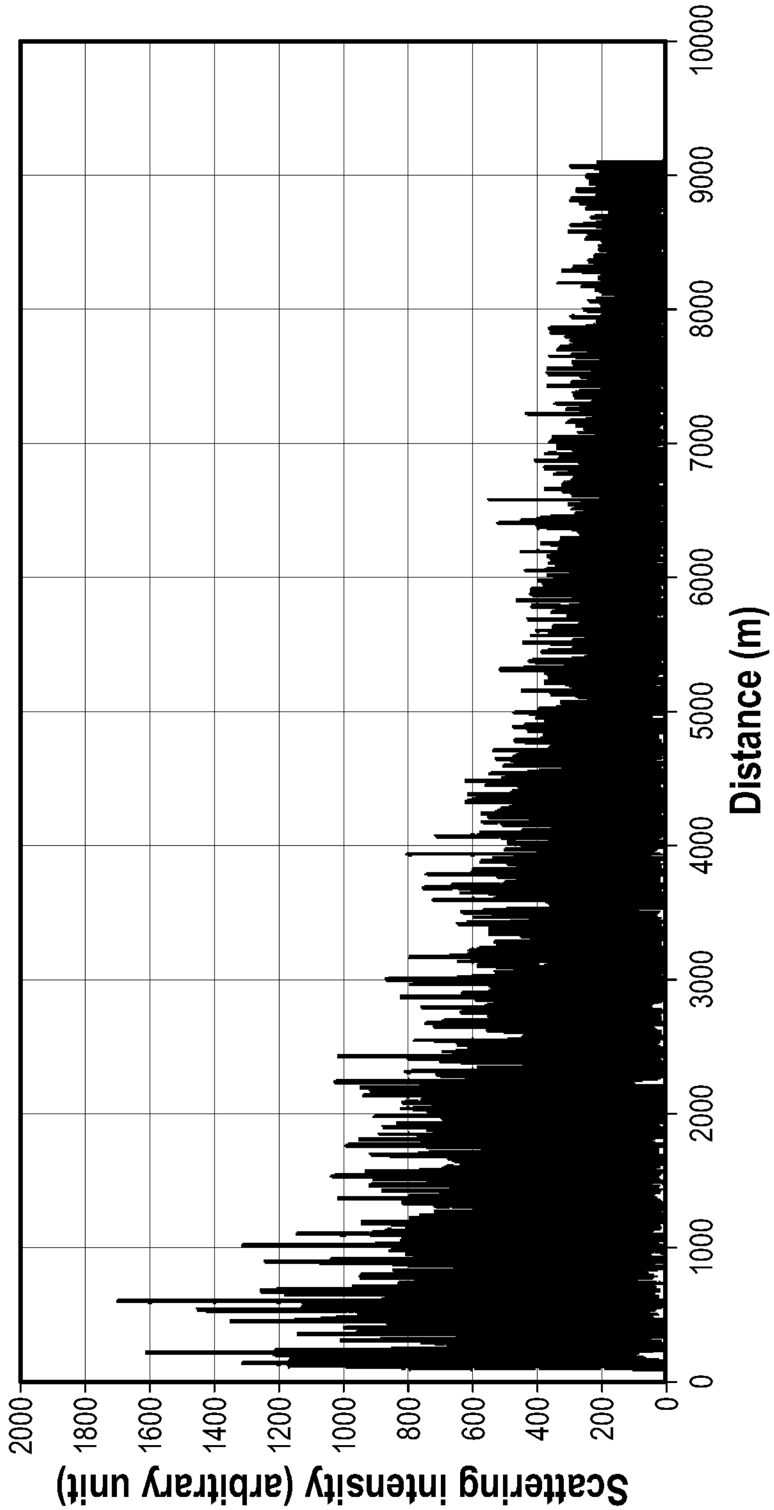
FIG. 33 is a graph of backscattered intensity where the signal-to-noise-ratio decreases rapidly due to the higher optical attenuation of these fibers within an enhanced fiber optic cable.

Alternatively, an enhanced fiber optic cable may be used during measurement operation and produce a higher backscatter intensity but with higher attenuation, as illustrated in FIG. 33. Enhanced fiber optic cable may be utilized for sensing fiber 710, transmission fiber 706, a return fiber 708

(e.g., referring to FIG. 7), and any other fiber optical cable that may be utilized for any system described above. As shown in the graph of FIG. 33, an enhanced fiber optic cable may produce a backscatter profile where the SNR decreases rapidly due to the higher optical attenuation of these fibers within the enhanced fiber optic cable. Additionally, when using an enhanced fiber optic cable, signal pulse levels cannot be increased through amplification as it will cause non-linear penalties and associated SNR degradation.

Figure 34:
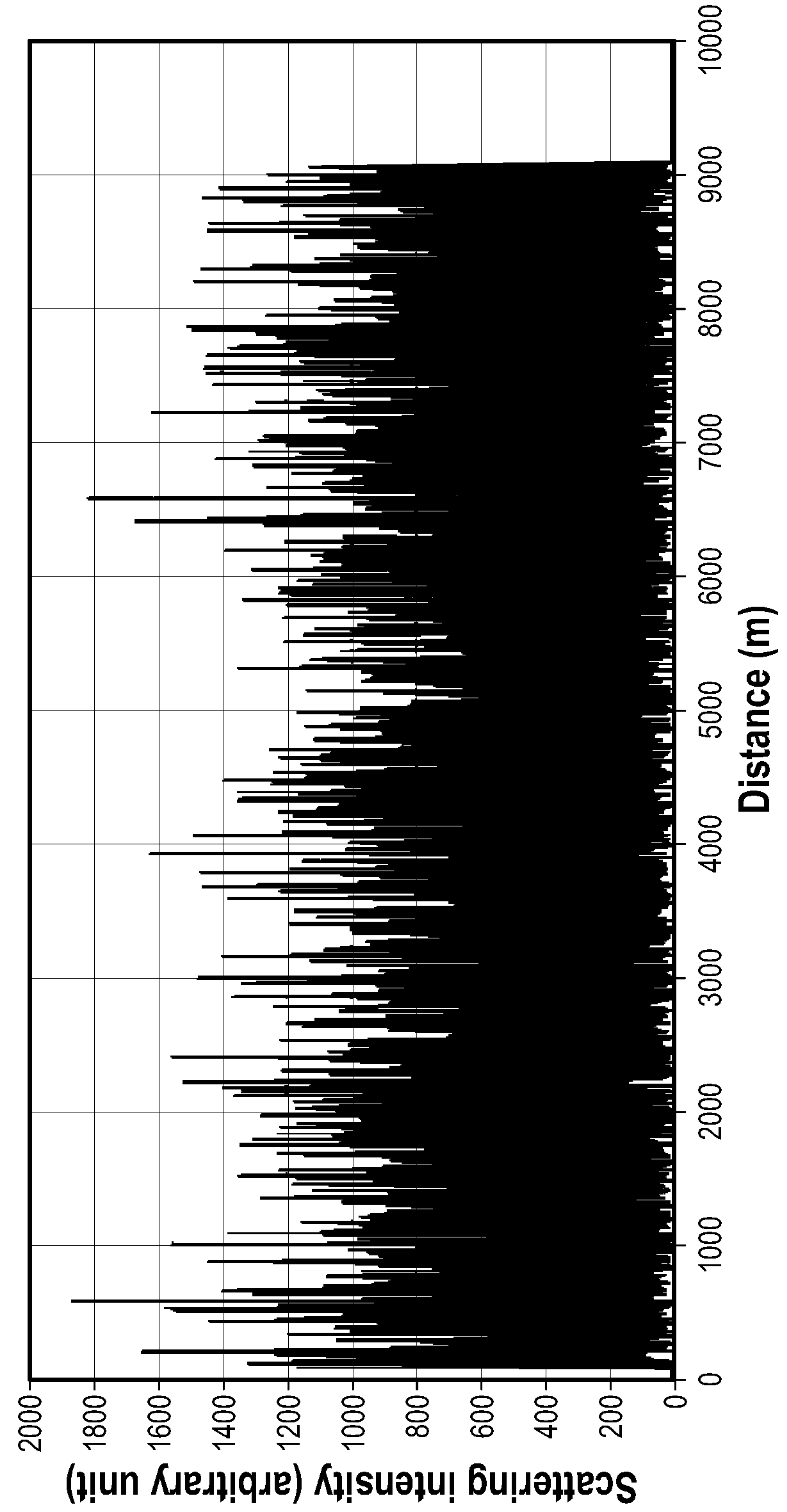
FIG. 34 is a graph of backscattered intensity that is similar from the front of the fiber optic cable to the back of the fiber optic cable.

Such enhanced fiber optic cable has been shown to substantially improve the optical SNR by as much as 10 dB to 20 dB over regular fiber. However, the issue of degraded optical SNR along the fiber length still remains, and in fact, the severity of the degradation increases with the enhanced fiber due to inherently higher attenuation. Therefore, a method for developing a fiber that may produce equally high level of backscattered intensity from the end of the fiber as from the front, as seen in the graph of FIG. 34, is discussed below.

The methods discussed below are utilized to identify a fiber optic cable that may be used in a planned DAS system 150 to overcome and actively mitigate the loss discussed above. Identifying a specific type of fiber optic cable 128 for a designed DAS system 150 may allow for long transmission lengths to be virtually invisible from a sensing system perspective while maintaining a healthy Optical Signal to Noise Ratio (OSNR) by creating a largely loss-less transmission span using a combination of distributed and point gain elements strategically placed in the overall system architecture.

Figure 35:
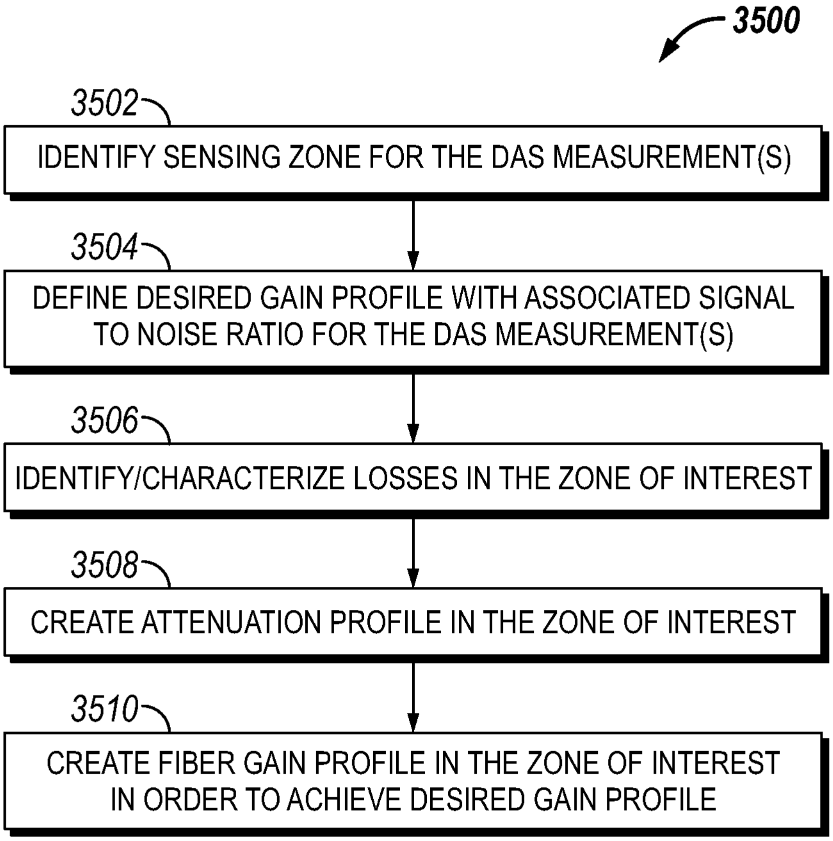
FIG. 35 illustrates a workflow for forming enhanced fiber optic cables that may produce a modified backscatter profile.

FIG. 35 illustrates workflow 3500 for forming enhanced fiber optic cables for a planned DAS system 150 that may produce a modified backscatter profile adjusted to compensate for attenuation in the subsea infrastructure and optical fiber while avoiding non-linear penalties in order to optimize Signal-to-Noise-Ratio (SNR). Workflow 3500 may begin with block 3502, in which the number of sensing zones and where the sensing zones are located is identified within one or more sensing fibers 710 of a DAS system 150. Sensing zones may be one or more specified areas along a sensing region, discussed above, in which an interested activity is expected to occur. Measurements may be taken only in these identified sensing zones or in the identified sensing zones and any part of sensing fiber 710. In block 3504, a gain profile for each sensing region and all sensing regions as a whole for measurements within DAS system 150 is identified. This is done by examining the potential signal paths between where a seismic source may be placed and the placement of sensing fiber 710, such that sufficient SNR measurements may be performed in signal paths traversing segments of interest in formation 104. Seismic source signal strength and frequency content at depth may be calculated and/or estimated based on experience and prior measurements, and the system SNR for good quality seismic interpretations may also be known thus enabling a calculation of fiber gain to achieve said system level SNR. Another example may comprise production flow monitoring where acoustic signal strength and frequency content of flow through inflow devices such as Inflow Control Valves (ICV), Autonomous Inflow Control Devices (AICD), and/or more general Flow Control Devices (FCD). In examples, an inner diameter is known of the inflow devices through field calibration and/or flow loop trials, it may detect a minimum level of flow through any of these devices. Additionally, leak detection may be performed using the methods and systems discussed above, where acoustic noise profiles (i.e., signal strength vs. frequency) is known for various leak conditions and a minimum leak detection threshold may be utilized, thus dictating a SNR along wellbore 122. The gain profile may be selected to meet the requirements for various applications like 4D seismic, Vertical Seismic Profiling (VSP), production monitoring, leak detection, sand detection, gas lift monitoring etc. where pulse power and/or pulse width and/or gauge length may be different between the different applications.

In block 3506, for each sensing region, losses are identified and characterized. Losses are identified if a connector, splice or a junction box is disposed at a location within DAS system 150. At the connector or junction box, loss is known based at least in part on the specification of the connector or junction box. For this disclosure, a connector is any device disposed on a fiber optic cable, such as a circulator 700, optical amplifier 800, WDM 1000, and/or the like (e.g., referring to FIGS. 7-10). A junction box may be where fiber optic lines are fused together at any location within DAS system 150. In block 3508, an attenuation profile is created for each sensing region. This attenuation profile is created by putting together the expected attenuation profile of the fiber optic cable (based on fiber spec) and the loss for each connector that is identified from block 3506. Using the attenuation profile in block 3508, a fiber gain profile is produced in block 3510 to counter the expected attenuation and loss from the attenuation profile. For example, a gain profile is created so that the combination of the gain and the attenuation/loss will offset each other. Using this fiber gain profile in block 3510, an enhanced fiber optic cable is created to have the fiber gain profile in each sensing region. The fiber gain profile may also be utilized in conjunction with the turning of DAS system 150.

Figure 36:
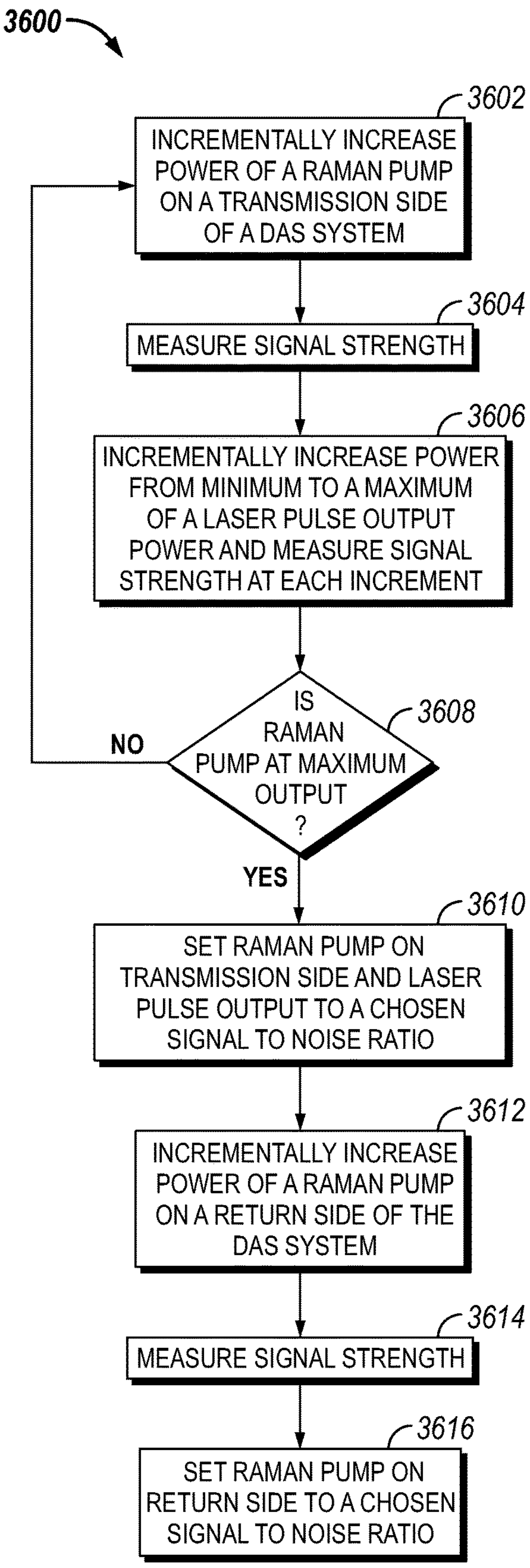
FIG. 36 illustrates a workflow for tuning the DAS system.

FIG. 36 illustrates workflow 3600 for tuning DAS system 150 (e.g., referring to FIG. 31). For workflow 3600, the configuration of FIG. 31 is discussed. However, any of the previous configurations discussed above may utilize workflow 3600. Thus, both DAS 1400 and B-DTS 1402 may be utilized for workflow 3600. Workflow 3600 may begin with block 3602, in which Raman Pump 1100 (on the transmission side of DAS system 150), starting at zero, may be incrementally increased in power. Without limitation, incremental increase may be about five percent, about ten percent, about twenty percent, about twenty five percent, about thirty percent about forty percent, and/or about fifty percent. In block 3604, signal strength may be measured and recorded using signal strength monitoring modules 1700/1702. Block 3604 may also include finding the optimal pulse repetition rate of the DAS system 150. In one example, this is achieved by identifying the fiber sensing regions before distal circulator 802 and remote circulator 804 for which backscattered light is received by DAS system 150, and by setting the pulse repetition rate as high as possible such that any given time only a single pulse traverses the identified fiber sensing regions before distal circulator 802 and remote circulator 804.

In block 3606, a laser pulse output power of transmitter 900 from DAS 1400 may incrementally increase power from a minimum to a maximum. Without limitation, incremental increase may be about five percent, about ten percent, about twenty percent, about twenty five percent, about thirty percent about forty percent, and/or about fifty percent. During this process, the laser pulse output power performs a sweep in which the power in increased incrementally and the SNR is measured at each increment. In this context, a sweep is defined as one or more measurement for each power increment setting starting at a minimum power output and proceeding to a maximum power output, or vice versa.

While sweeping is discussed for laser pulse output power, sweeping may also be utilized for varying the signal pulse power and/or signal pulse width and/or gauge length as many DAS systems allow different pulse power/width/gauge length depending on the requirements for the different applications. It should be noted that the power from Raman Pump 1100 is kept the same during the sweep. Signal strength is measured at each increase during the sweep. As power is incrementally increased in the laser pulse output power of transmitter 900, signal strength and/or SNR is measured and recorded using by signal strength monitoring modules 1700/1702 and/or DAS interrogator 1902 (e.g., referring to FIG. 19) as described above for every incremental increase.

In block 3608, if the power from Raman Pump 1100 is not at maximum, blocks 3602-3608 may be repeated until the power from Raman Pump 1100 is at a maximum and cannot be increased anymore. The measurements taken from blocks 3604 and 3606 may be utilized to tune Raman Pump 1100 and transmitter 900. For example, signal strength monitoring modules 1700/1702 may monitor signal strength as a function of distance. Thus, the signal strength vs. wavelength over distance may be used to determine optimum profile/change in Raman gain when there may be multiple wavelengths in Raman Pump 1100. This may allow for Raman amplification to create a uniform gain for all laser pulse outputs from transmitter 900 (e.g., referring to FIG. 9) as laser pulse outputs at different wavelengths may be utilized in DAS 1400. To determine signal strength vs. wavelength, signal strength monitoring modules 1700/1702 may measure back scattered light from signal pulses over time and/or distance. A high back reflection may indicate a broken fiber that may be exceeding eye safety conditions as Raman Pump 1100 is incrementally increased in power. A poor optical connector mate may generate high back reflections, and a poor optical connection may be lossy such that damage conditions with high Raman and/or sensing system laser peak pulse may be reached. Additionally, Signal-to-Noise-Ratio (SNR) is recorded by strength monitoring modules 1700/1702 and/or DAS interrogator 1902 (e.g., referring to FIG. 19).

Thus, in block 3610, Raman Pump 1100 and laser pulse output from transmitter 900 may be tuned and/or configured to the measurements taken in blocks 3604 and 3606 that maximize signal-to-noise (SNR) ratio within DAS system 150. Once this is performed, Raman Pump 1500 may be tuned on the receiving side DAS system 150.

In block 3612, with Raman Pump 1100 and transmitter 900 tunned to maximize SNR, Raman Pump 1500 (on the receiving side of DAS system 150), starting at zero, may be incrementally increased in power. The receiving side of DAS system 150 may allow for the transmission of the return signal, which is described above. Without limitation, incremental increase may be about five percent, about ten percent, about twenty percent, about twenty five percent, about thirty percent about forty percent, and/or about fifty percent. In block 3614, signal strength may be measured and recorded using signal strength monitoring modules 1700/1702, using the methods and systems described above. In block 3616, Raman Pump 1500 may be tuned and/or configured to the measurements taken in blocks 3614 that maximize signal-to-noise (SNR) ratio within DAS system 150 for both the transmission and receiving side of DAS system 150. As noted above, workflow 3600 may be utilized for DAS system 1400 and B-DTS 1402 (e.g., referring to FIG. 14). Additionally, any other system operating in the gain window of the optical amplifiers may be utilized. Similarly, the sensing and gain principles outlined above may be applied to other wavelengths and wavelength windows.

Improvements over current technology is the ability to target specific sensing and measurement applications where SNR requirements may vary over depth and time. The custom fiber gain profile may allow different system gain levels used at different time to optimize different applications where signal pulse characteristics, for example, power and/or pulse width and/or gauge length may be changed to meet application specific SNR requirements. A change in sensing application (i.e., a change in pulse power and/or pulse width and/or gauge length or other similar system parameters) may utilize a system SNR optimization given that optical attenuation, system and interrogator losses, laser degradation etc. may vary over time. The DAS system may incorporate shutters in the return path to allow blocking back scattered light as a function of time if some sections of the fiber exceed certain thresholds. The systems and methods for a DAS system 150 (e.g., referring to FIG. 1) within a subsea environment may comprise any of the various features of the systems and methods disclosed herein, including one or more of the following statements.

Statement 1: A method for tuning a distributed acoustic sensing (DAS) system. The method may comprise determining a signal strength from a first Raman Pump in the DAS system, sweeping a laser pulse output from a transmitter; wherein the sweeping is an incremental increase of a power of the laser pulse output from a minimum pulse power to a maximum pulse power, and measuring a first signal-to-noise-ratio (SNR) for each of the incremental increase of the power of the laser pulse output. The method may further comprise selecting a maximum SNR from the first SNR for each of the incremental increase of the power of the laser pulse output and configuring the first Raman Pump and the laser pulse output based at least in part on the maximum SNR.

Statement 2: The method of statement 1, further comprising measuring a back reflection with a signal strength monitoring module.

Statement 3: The method of statement 2, wherein a high back reflection indicates a broken fiber optic cable or an optical connector not mated or a high reflection optical connection.

Statement 4: The method of any previous statements 1 or 2, wherein the signal strength is measured with a signal strength monitoring module.

Statement 5: The method of any previous statements 1, 2, or 4, wherein the transmitter is disposed in a Distributed Acoustic Sensing (DAS) system.

Statement 6: The method of any previous statements 1, 2, 4, or 5, wherein the transmitter is disposed in a Brillouin Distributed Temperature Sensing (B-DTS) system.

Statement 7: The method of any previous statements 1, 2, or 4-6, wherein the transmitter is disposed in a Distributed Strain Sensing (DSS) system.

Statement 8: The method of any previous statements 1, 2, or 4-7, further comprising increasing the signal strength from the first Raman Pump to form a second signal strength, sweeping the laser pulse output from the transmitter in the distributed acoustic sensing (DAS) system, wherein the sweeping is an incremental increase of the power of the laser pulse output from a minimum pulse power to a maximum pulse power, and measuring a second SNR for each of the incremental increase of the power of the laser pulse output. The method may further comprise selecting the maximum SNR from the first SNR or second SNR and configuring the first Raman Pump and the laser pulse output based at least in part on the maximum SNR.

Statement 9: The method of statement 8, further comprising increasing the second signal strength of the Raman Pump incrementally to a maximum signal strength is reached.

Statement 10: The method of statements 8 or 9, further comprising measuring the second signal strength with a signal strength monitoring module.

Statement 11: The method of any previous statements 8-10, further comprising determining the signal strength from a second Raman Pump in a distributed acoustic sensing (DAS) system, increasing the signal strength incrementally from the second Raman Pump, and measuring a third signal-to-noise-ratio (SNR) for each of the incremental increase of the second Raman Pump. The method may further comprise selecting the maximum SNR from the third SNR for each of the incremental increase of the power of the laser pulse output and configuring the second Raman Pump based at least in part on the maximum SNR.

Statement 12: The method of statement 11, further comprising increasing the signal strength of the second Raman Pump incrementally to a maximum signal strength is reached.

Statement 13: The method of statements 11 or 12, further comprising measuring the signal strength from the second Raman Pump with a signal strength monitoring module.

Statement 14: A method may comprise identifying one or more sensing zones for one or more sensing fibers of a distributed acoustic sensing (DAS) system, identifying a gain profile for each of the one or more sensing regions, identifying one or more losses for each of the one or more sensing regions, and creating an attenuation profile for each of the one or more sensing regions. The method may further comprise creating a fiber profile to counter the attenuation profile and the losses for the one or more sensing regions and forming an enhanced fiber optic cable based at least in part on the fiber profile.

Statement 15: The method of statement 14, further comprising disposing the enhanced fiber optic cable into a wellbore.

Statement 16: The method of statement 15, wherein the enhanced fiber optic cable is a sensing fiber.

Statement 17: The method of statements 15 or 16, wherein the enhanced fiber optic cable is a transmission fiber.

Statement 18: The method of any previous statements 15-17, wherein a transmitter is connected to the enhanced fiber optic cable.

Statement 19: The method of statement 18, wherein the transmitter is disposed in a Distributed Acoustic Sensing (DAS) system.

Statement 20: The method of statements 18 or 19, wherein the transmitter is disposed in a Brillouin Distributed Temperature Sensing (B-DTS) system.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any comprised range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:

identifying one or more sensing zones for one or more sensing fibers of a distributed acoustic sensing (DAS) system;

identifying a gain profile for each of the one or more sensing regions;

identifying one or more losses for each of the one or more sensing regions;

creating an attenuation profile for each of the one or more sensing regions;

creating a fiber profile to counter the attenuation profile and the losses for the one or more sensing regions; and forming an enhanced fiber optic cable based at least in part on the fiber profile.

2. The method of claim 1, further comprising disposing the enhanced fiber optic cable into a wellbore.

3. The method of claim 2, wherein the enhanced fiber optic cable is a sensing fiber.

4. The method of claim 2, wherein the enhanced fiber optic cable is a transmission fiber.

5. The method of claim 2, wherein a transmitter is connected to the enhanced fiber optic cable.

6. The method of claim 5, wherein the transmitter is disposed in a Distributed Acoustic Sensing (DAS) system.

7. The method of claim 5, wherein the transmitter is disposed in a Brillouin Distributed Temperature Sensing (B-DTS) system.

8. The method of claim 1, further comprising measuring a back reflection with a signal strength monitoring module.

9. The method of claim 8, wherein a high back reflection indicates a broken fiber optic cable or an optical connector not mated or a high reflection optical connection.

10. The method of claim 8, wherein a signal strength is measured with a signal strength monitoring module.

11. A distributed acoustic sensing (DAS) system comprising:

an interrogator;

an optical amplifier configured to amplify one or more sensing regions on one or more sensing fibers;

an enhanced fiber optic cable formed at least in part by a fiber profile, wherein the enhanced fiber optic cable is attached to the interrogator at a first end;

one or more circulators attached to a second end opposite the first end of the enhanced fiber optic cable; and a downhole sensing fiber attached to the circulator.

12. The DAS system of claim 11, wherein the interrogator further comprises one or more Raman Pumps.

13. The DAS system of claim 11, wherein the interrogator comprises one or more lasers.

14. The DAS system of claim 12, wherein the interrogator comprises one or more receivers.

15. The DAS system of claim 11, wherein the interrogator is configured to receive backscattered light from one or more sensing regions.

16. The DAS system of claim 11, wherein the optical amplifier is disposed within the enhanced fiber optic cable.

17. The DAS system of claim 11, further comprising a wavelength division multiplexer (WDM) disposed on the enhanced fiber optic cable between a proximal circulator and the interrogator.

18. The DAS system of claim 11, further comprising one or more Fiber Bragg Gratings.

19. The DAS system of claim 11, wherein a transmitter is connected to the enhanced fiber optic cable.

20. The DAS system of claim 19, wherein the transmitter is disposed in a Brillouin Distributed Temperature Sensing (B-DTS) system.

21. The DAS system of claim 11, wherein the fiber profile is created based at least in part on one or more amplified sensing regions amplified by the optical amplifier.

22. A distributed acoustic sensing (DAS) system comprising:

an interrogator;

an enhanced fiber optic cable formed at least in part by a fiber profile, wherein the enhanced fiber optic cable is attached to the interrogator at a first end;

one or more circulators attached to a second end opposite the first end of the enhanced fiber optic cable;

a downhole sensing fiber attached to the circulator; and one or more optical amplifier assemblies disposed within the enhanced fiber optic cable.

* * * * *